(12) United States Patent
King

(10) Patent No.: US 12,380,461 B2
(45) Date of Patent: *Aug. 5, 2025

(54) SALES AND MARKETING ASSISTANCE SYSTEM USING PREDICTIVE ANALYTICS AND METHOD

(71) Applicant: Spectrum Communications & Consulting, LLC, Boca Raton, FL (US)

(72) Inventor: Tyrone King, Boca Raton, FL (US)

(73) Assignee: Sprectrum Communications & Consulting, LLC, Boca Raton, FL (US)

(*) Notice: Subject to any disclaimer, the term of this patent is extended or adjusted under 35 U.S.C. 154(b) by 230 days.

This patent is subject to a terminal disclaimer.

(21) Appl. No.: 18/225,731

(22) Filed: Jul. 25, 2023

(65) Prior Publication Data

US 2023/0368229 A1 Nov. 16, 2023

Related U.S. Application Data

(63) Continuation of application No. 17/149,221, filed on Jan. 14, 2021, now Pat. No. 11,756,063.

(51) Int. Cl.
*G06Q 30/0204* (2023.01)
*G06N 20/00* (2019.01)
*G06Q 30/01* (2023.01)
*G06Q 30/0201* (2023.01)

(52) U.S. Cl.
CPC ......... *G06Q 30/0205* (2013.01); *G06N 20/00* (2019.01); *G06Q 30/01* (2013.01); *G06Q 30/0201* (2013.01)

(58) Field of Classification Search
None
See application file for complete search history.

(56) References Cited

U.S. PATENT DOCUMENTS 7,340,411 B2 * 3/2008 Cook ................. G06Q 30/0201
705/7.33
2004/0103017 A1 * 5/2004 Reed ................. G06Q 30/0246
705/14.42

(Continued)

OTHER PUBLICATIONS

A. Abbassi, R.Y.K. Lau and Brown, "Predicting behavior," in IEEE Intelligent Systems, vol. 30, No. 3, pp. 35-43, May-Jun. 2015, doi:10.1109/MIS.2015.19. (Year: 2015).*

(Continued)

*Primary Examiner* — Mehmet Yesildag
(74) *Attorney, Agent, or Firm* — Nyman IP LLC; Scott Nyman

(57) ABSTRACT

A sales and marketing assistance system using predictive analytics is provided for assisting sales by leveraging predictive analytics. The sales and marketing assistance system using predictive analytics may include a database, data warehouse, parse component, analytic component, insight component, dashboard component, mapping component, contact management component, review management component, campaign component, and messaging component. A method for assisting sales by leveraging predictive analytics using the sales and marketing assistance system using predictive analytics is also provided.

19 Claims, 6 Drawing Sheets

(56) References Cited

U.S. PATENT DOCUMENTS

| | | | | |
|---|---|---|---|---|
| 2005/0222829 | A1* | 10/2005 | Dumas | G06Q 10/02 |
| | | | | 703/2 |
| 2013/0103764 | A1* | 4/2013 | Verkasalo | G06N 7/01 |
| | | | | 709/204 |
| 2014/0032271 | A1* | 1/2014 | Nordstrand | G09B 29/007 |
| | | | | 705/7.34 |
| 2020/0356924 | A1* | 11/2020 | Frensch | G06Q 30/0205 |
| 2021/0125209 | A1* | 4/2021 | Adibi | H04M 3/5191 |
| 2021/0350448 | A1* | 11/2021 | Phillips | G06Q 30/0631 |

OTHER PUBLICATIONS

S.P. Singh, A. Kumar, N. Yadav and R. Awasthi, "Data Mining: Consumer Behavior Analysis," 2018 3rd IEEE International Conference on Recent Trends in Electronics, Information & Communication Technology (RTEICT), Bangalore, India, 2018, pp. 1917-1921, doi:10.1109/RTEICT42901.2018.9012300. (Year: 2018).*

Kurc, Tahsin, et al. "Visualization of Large Data Sets with the Active Data Repository." IEEE Computer Graphics and Applications, vol. 29, No. 4, Jul.-Aug. 2001, pp. 24-33 (Year: 2001).*

"Ray Casting." Techopedia.WebArchive, Apr. 4, 2019, <https://web.archive.org/web/20190404150906/https://www.techopedia.com/definition/21614/ray-casting>, (Year: 2019).*

Galletta, Antonino, et al. "An Innovative Methodology for Big Data Visualization for Telemedicine." IEEE Transactions on Industrial Informatics, vol. 15, No. 1, Jan. 2019, pp. 490-497. (Year: 2019).*

Nidzwetzki, Jan Kristof, et al. "Demo Paper: Large Scale Spatial Data Processing With User Defined Filters In BBoxDB." 2019 IEEE International Conference on Big Data, pp. 4125-4128. (Year: 2019).*

* cited by examiner

SALES AND MARKETING ASSISTANCE SYSTEM USING PREDICTIVE ANALYTICS AND METHOD

CROSS-REFERENCE TO RELATED APPLICATION

This application claims the priority from U.S. non-provisional patent application Ser. No. 17/149,221 filed Jan. 14, 2021. The foregoing application is incorporated in its entirety herein by reference.

FIELD OF THE INVENTION

The present disclosure relates to a sales and marketing assistance system using predictive analytics. More particularly, the disclosure relates to assisting sales and marketing by leveraging predictive analytics.

BACKGROUND

To have a successful business, a business operator must have customers to conduct business with. Reaching these customers requires an effective sales technique and ability to engage potential customers and convert them into actual customers. As the business environment grows more competitive, new techniques are needed to reach prospective customers that are in need of a business's services and engage those prospective customers to convert them into actual current customers.

Technological developments have assisted with determining which potential customers may fit within a demographic targeted by business sales teams. However, these developments are typically provided in the abstract and lack sufficient knowledge and information to have a high efficacy of predicting whether a prospective customer will in fact convert into a current paying customer. While demographics have been collected about individuals and prospective customers over many years, what to do with those demographics and how to apply those to a sales model still requires large-scale ingenuity and inventiveness to bring it into an effective sales platform. No known platform leverages machine learning, predictive analytics, and insight in a way that is user accessible and provides high-value results such that the market demands.

Therefore, a need exists to solve the deficiencies present in the prior art. What is needed is a system to assist sales agents in converting prospective customers. What is needed is a system to parse and/or analyze data to extract useful information relating to sales prospects. What is needed is a system to apply machine learning to events and prospective customer profiles to increase the likelihood of making a sale. What is needed is a system to intelligently track events that create demand for services that can be marketed to prospective customers. What is needed is a system to determine an agreeability condition of a prospective customer and match with a sales agent with a compatible agreeability approach or increase the likelihood of a sale. What is needed is a method to increase sales performance using an intelligent system that analyzes data to provide useful information. What is needed is a method of applying machine learning to customer and event data to increase the likelihood of converting a prospective customer into a sale.

SUMMARY

An aspect of the disclosure advantageously provides a system to assist sales agents in converting prospective customers. An aspect of the disclosure advantageously provides a system to parse and/or analyze data to extract useful information relating to sales prospects. An aspect of the disclosure advantageously provides a system to apply machine learning to events and prospective customer profiles to increase the likelihood of making a sale. An aspect of the disclosure advantageously provides a system to intelligently track events that create demand for services that can be marketed to prospective customers. An aspect of the disclosure advantageously provides a system to determine an agreeability condition of a prospective customer and match with a sales agent with a compatible agreeability approach or increase the likelihood of a sale. An aspect of the disclosure advantageously provides a method to increase sales performance using an intelligent system that analyzes data to provide useful information. An aspect of the disclosure advantageously provides a method of applying machine learning to customer and event data to increase the likelihood of converting a prospective customer into a sale.

A system enabled by this disclosure advantageously provides a platform to assist a sales team with identifying potential customers, assist with engaging with the potential customers in a sales environment, and providing predictive analytics to assist with converting the potential customer into actual, paying customers. A system enabled by this disclosure may advantageously predict customer engagement, improve marketing focus, increase returns in marketing and sales investment, and otherwise facilitate a business with growing their customer base and improving customer satisfaction. A system enabled by this disclosure may be effective in industries such as roofing, siding installers, window installers, carpenters, contractors, electricians, plumbers, tree trimmers, gardeners, landscapers, and/or other industries that would be appreciated by a person of skill in the art after having the benefit of this disclosure.

Accordingly, the disclosure may feature a machine readable non-transitory storage medium storing executable program instructions that when executed cause a computerized device to operate a sales and marketing assistance system. The sales and marketing assistance system may retrieve data comprising raw data from a provider comprising information relating to a weather event. This data may be storable in a database via a fetch component. The system may generate extracted information from the data comprising the raw data indicative of a condition to increase a likelihood of conversion that a prospective customer will engage in a commercial transaction via a parse component, the extracted information comprising event information associated with an event identified from the data.

The system may further generate derived information from the data reflective of the prospective customer to build a prospective customer profile via an analytic component. The derived information may be associated with the prospective customer identified from the data by applying analysis rules. The derived information may be different from and supplemental to the data and the extracted information. The system may generate predictive information by determining a probability of correlation between the extracted information and the derived information indicative of a predictive correlation that the prospective customer may have an elevated likelihood of conversion to engage in the commercial transaction via an insight component, which may apply machine learning trained with at least the extracted information and/or the derived information to detect patterns of predictable outcomes given various combinations of input conditions.

Additionally, the system may present the predictive information and may facilitate the commercial transaction via a dashboard component. The dashboard component may at least partially visualize the predictive information via a display by visually presenting the derived information in the context of the extracted information via a map comprising a geographic boundary in which the prospective customer may be located via a mapping component. The system may operate the machine learning by determining weighted assumptions about how the prospective customer would engage in the commercial transaction based on information accessed from the database comprising proximity to the weather event, relevant search activity by the prospective customer, and consumer spending data for the prospective customer to predict whether the prospective customer has the elevated likelihood of conversion. The system may also use weighted assumptions by the machine learning which may be updated by the system to adjust weighting to reflect how the performant outcomes of past assumptions of the machine learning were and may improve future predictive capabilities based on updated weighted assumptions.

In another aspect, at least part of the extracted information, at least part of the derived information, and at least part of the prospective customer profile may be stored in the database and retrievable from the database via a telecommunication network.

In another aspect, the machine learning may be additionally trained with at least the input conditions comprising case studies comprising demographics, psychographics, homeowner information, household types, household details, property details, and/or weather events.

In another aspect, the map may selectively display historical information, past information, substantially real-time information, and predictive future information relating to the weather event as it relates to the prospective customer.

In another aspect, the mapping component may output a mapping visualization product including an event layer and a prospective customer layer. The event layer may define the geographic boundary using the extracted information relating to the event. The prospective customer layer may define the prospective customer having the increased likelihood of conversion relating to the event.

In another aspect, the geographic boundary of the event layer may be at least partially generated using ray casting.

In another aspect, the system may perform contact management via a contact management component. The contact management component may comprise matching psychographics via a psychographics matching engine to extract the psychographics from the prospective customer profile indicative of an agreeability condition for the prospective customer. The contact management component may further recommend an agent via an agent recommendation engine to select the agent possessing an agreeability approach to increase a likelihood of relatability with the agreeability condition of the prospective customer associated with the prospective customer profile. Additionally, the agent may have the likelihood of relatability that is sufficient to recommend proposing the commercial transaction to the prospective customer.

In another aspect, the system may further generate a match index associated with the prospective customer indicative of the likelihood of conversion. The match index may be adjusted based on at least the psychographics of the prospective customer, inclusion of the prospective customer in the geographic boundary, and/or the event.

In another aspect, a personality profile may be associated with the prospective customer reflective of at least internet activity history and commercial purchase history. The match index may be adjusted considering the personality profile of the prospective customer.

In another aspect, the system may further selectively display the prospective customer based on at least the psychographics, inclusion in the geographic boundary, and/or the event via a filtering engine.

In another aspect, the content management component may be accessible by the agent via the dashboard component. The agreeability condition associated with the prospective customer may be displayed via the dashboard component. The likelihood of relatability between the agent and the prospective customer may be displayed by the dashboard component. The agent and the prospective customer may be matched via the dashboard component.

In another aspect, the system may facilitate communication between the agent and the prospective customer via a messaging component, the communication being logged and analyzed to identify a strategy that increases the likelihood of conversion.

In another aspect, the system may analyze feedback from a converted customer and derive referral information indicative of the potential customer having a likelihood of influenceability from the converted customer via a review management component. The referral information may be analyzed by the insight component in determining a probability of conversion.

In another aspect, the data may include weather data indicative of a weather event. The event may include the weather event.

According to an embodiment of this disclosure, the system may include a fetch component, a parse component, an analytic component, an insight component, and a contact management component. The fetch component may retrieve data from a provider, the data being storable in a database. The parse component may generate extracted information from the data indicative of a condition to increase a likelihood of conversion that a prospective customer will engage in a commercial transaction, the extracted information comprising event information associated with an event identified from the data. The analytic component may generate derived information from the data reflective of the prospective customer to build a prospective customer profile, the derived information being associated with the prospective customer identified from the data. The insight component may generate predictive information by determining a probability of correlation between the extracted information and the derived information indicative of a predictive correlation that the prospective customer has an elevated likelihood of conversion to engage in the commercial transaction.

The contact management component may comprise a psychographics matching engine to extract psychographics from the prospective customer profile indicative of an agreeability condition for the prospective customer, and an agent recommendation engine to select an agent possessing an agreeability approach to increase a likelihood of relatability with the agreeability condition of the prospective customer associated with the prospective customer profile. The agent having a likelihood of relatability that is sufficient may be recommended to propose the commercial transaction to the prospective customer. At least part of the extracted information, at least part of the derived information, and at least part of the prospective customer profile may be stored in the database and retrievable from the database via a telecommunication network. The insight component may generate the predictive information by applying machine learning trained with at least the extracted information and/or the derived information.

In another aspect, a dashboard component may be included to present the predictive information and facilitate the commercial transaction, the dashboard component at least partially visualizing the predictive information via a display. The dashboard component may include a mapping component to visually present the derived information in the context of the extracted information via a map comprising a geographic boundary in which the prospective customer is located. The mapping component may output a mapping visualization product including an event layer defining the geographic boundary using the extracted information relating to the event and a prospective customer layer defining the prospective customer having the increased likelihood of conversion.

A contact management component may generate a match index associated with the prospective customer indicative of the likelihood of conversion. The match index may be adjusted based on at least the psychographics of the prospective customer, inclusion of the prospective customer in the geographic boundary, and/or the event. A personality profile may be associate with the prospective customer reflective of at least internet activity history and commercial purchase history. The match index may be adjusted considering the personality profile of the prospective customer.

According to an embodiment of this disclosure, a method is provided for sales assistance via a sales and marketing assistance system comprising machine readable non-transitory storage medium on which executable program instructions are stored that when executed cause a computerized device to operate the sales and marketing assistance system. The method may include (a) retrieving data comprising raw data from a provider comprising information relating to a weather event, the data being storable in a database. The method may additionally include (b) generating extracted information from the data comprising the raw data indicative of a condition to increase a likelihood of conversion that a prospective customer will engage in a commercial transaction, the extracted information comprising event information associated with an event identified from the data. The method may also include (c) generating derived information from the data reflective of the prospective customer to build a prospective customer profile, the derived information being associated with the prospective customer identified from the data, the derived information being different from and supplemental to the data and the extracted information. Furthermore, the method may include (d) generating predictive information by determining a probability of correlation between the extracted information and the derived information indicative of a predictive correlation that the prospective customer has an elevated likelihood of conversion to engage in the commercial transaction by applying machine learning trained with at least the extracted information and/or the derived information to detect patterns of predictable outcomes given various combinations of input conditions.

The method may include (e) presenting the predictive information and facilitating the commercial transaction via a dashboard component by at least partially visualizing the predictive information via a display. The machine learning which may operate by step (d), may determine weighted assumptions about how the prospective customer would engage in the commercial transaction based on information accessed from the database comprising proximity to the weather event, relevant search activity by the prospective customer, and consumer spending data for the prospective customer to predict whether the prospective customer has the elevated likelihood of conversion. The weighted assumptions used by the machine learning may be updated by the system to adjust weighting to reflect how performant outcomes of past assumptions of the machine learning were and improve future predictive capabilities based on updated weighted assumptions. At least part of the extracted information, at least part of the derived information, and at least part of the prospective customer profile may be stored in the database and retrievable from the database via a telecommunication network.

In another aspect, the method may include (f) presenting visually the derived information in the context of the extracted information via a map comprising a geographic boundary in which the prospective customer is located. The method may additionally include (g) outputting a mapping visualization product including an event layer defining the geographic boundary using the extracted information relating to the event and a prospective customer layer defining the prospective customer relating to the event having the increased likelihood of conversion.

In another aspect, the method may include (h) extracting psychographics from the prospective customer profile indicative of an agreeability condition for the prospective customer. The method may additionally include (i) selecting an agent possessing an agreeability approach to increase a likelihood of relatability with the agreeability condition of the prospective customer associated with the prospective customer profile. The method may also include (j) recommending the agent having the likelihood of relatability that is sufficient to propose the commercial transaction to the prospective customer. Furthermore, the method may include (k) generating a match index associated with the prospective customer indicative of the likelihood of conversion. The method may include (l) adjusting the match index based on at least the psychographics of the prospective customer, inclusion of the prospective customer in a geographic boundary, and/or the event.

Terms and expressions used throughout this disclosure are to be interpreted broadly. Terms are intended to be understood respective to the definitions provided by this specification. Technical dictionaries and common meanings understood within the applicable art are intended to supplement these definitions. In instances where no suitable definition can be determined from the specification or technical dictionaries, such terms should be understood according to their plain and common meaning. However, any definitions provided by the specification will govern above all other sources.

Various objects, features, aspects, and advantages described by this disclosure will become more apparent from the following detailed description, along with the accompanying drawings in which like numerals represent like components.

DETAILED DESCRIPTION

Figure 1:
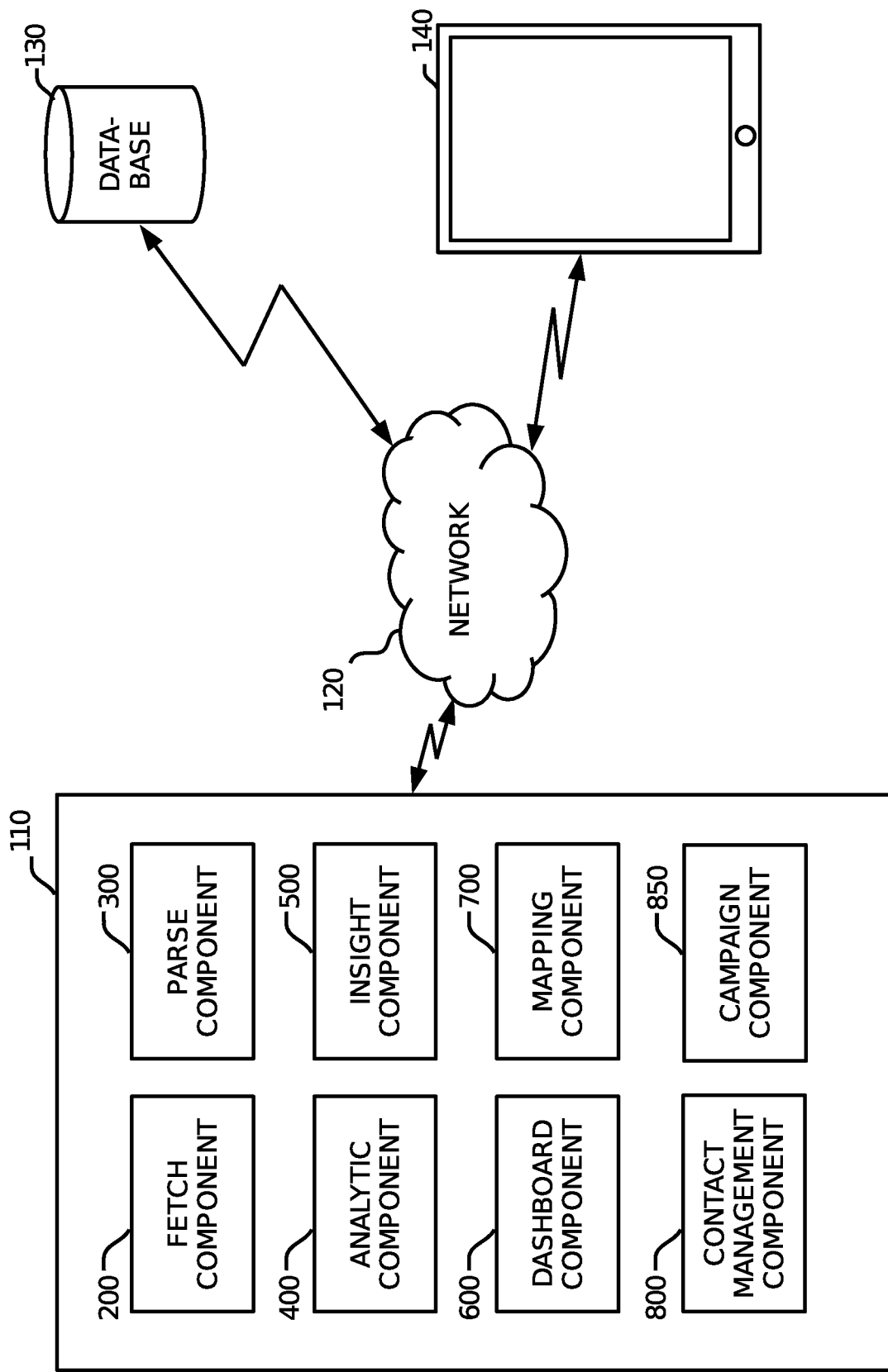
FIG. 1 is a block diagram view of an illustrative sales and marketing assistance system, according to an embodiment of this disclosure.

The following disclosure is provided to describe various embodiments of a sales and marketing assistance system using predictive analytics. Skilled artisans will appreciate additional embodiments and uses of the present invention that extend beyond the examples of this disclosure. Terms included by any claim are to be interpreted as defined within this disclosure. Singular forms should be read to contemplate and disclose plural alternatives. Similarly, plural forms should be read to contemplate and disclose singular alternatives. Conjunctions should be read as inclusive except where stated otherwise.

Expressions such as "at least one of A, B, and C" should be read to permit any of A, B, or C singularly or in combination with the remaining elements. Additionally, such groups may include multiple instances of one or more element in that group, which may be included with other elements of the group. All numbers, measurements, and values are given as approximations unless expressly stated otherwise. The expression "between" is intended to include comparison between two or more items, and is not intended to be limited only to situations where specifically two items are being compared unless expressly stated otherwise.

For the purpose of clearly describing the components and features discussed throughout this disclosure, some frequently used terms will now be defined, without limitation. The term database, as it is used throughout this disclosure, is defined as an electronic repository of information storable on transitory media that may be distributed across one or more computer systems, which may facilitate storage, queries, and access to information relatively efficiently. The term data warehouse, as it is used throughout this disclosure, is defined as a system that aggregates data from one or more sources, which may be used for reporting and analysis. The term event, as it is used throughout this disclosure, is defined as something that happens, such as a weather storm, hail storm, storm with high winds, other noteworthy happening, or other incident or occurrence as would be appreciated by those of skill in the art.

The term data, as it is used throughout this disclosure, is defined as facts, records, and details about events in digital form that can be transmitted, received, processed, analyzed, an otherwise used by a computerized device. The term information, as it is used throughout this disclosure, is defined as knowledge, facts, conclusions, measures, and other indications that may be gathered though analyzing and otherwise processing data, observation, correlation, communication, other information, or forms of intelligence obtained from investigation, study, or instruction.

The term extracted information, as it is used throughout this disclosure, is defined as information that is obtained from extracting facts and other knowledge included in the data, such as information indicative of a condition that may increase the likelihood of converting a prospective customer into an actual customer to engage in a commercial transaction. The term derived information, as it is used throughout this disclosure, is defined as information that is obtained from calculations based on facts and other knowledge included in the data, such as information reflective of a prospective customer and associated with the prospective customer. The term predictive information, as it is used throughout this disclosure, is defined as information that is predictive from analyzing and/or correlating the data, the extracted information, and/or the derived information to assist with determining a probability that a prospective customer has an elevated likelihood of conversion to engage in a commercial transaction. The term predictive match index (PMI), additionally referred to as match index without limitation, as it is used throughout this disclosure, is defined to provide an indication associated with a prospective customer of a likelihood of conversion into an existing customer.

The term service demand area (SDA), as it is used throughout this disclosure, is defined as an area around which a boundary may be defined that may include one or more potential leads or other customers for which marketing and sales efforts may be focused. The term ray casting, as it is used throughout this disclosure, is defined as determining an area by evaluating the number of intersections between a linear element and a polygonal element, as will be appreciated by those of skill in the art.

The term demographics, as it is used throughout this disclosure, is defined as statistical characteristics of human populations used to identify markets and establish customer profiles. The term psychograhics, as it is used throughout this disclosure, is defined as the study and classification of people according to their attitudes, aspirations, and other psychological criteria, which may include subjective information, interests, spending habits, values, and other information that may be indicative to the likelihood of engaging in a commercial transaction. The term agreeability, as it is used throughout this disclosure, is defined as an indication that positive and effective communication is likely between participants, for example, by showing matching interests, tastes, and needs. The term relatability, as it is used throughout this disclosure, is defined as an ability to communicate the perspectives, and encourage consensus between participants. The term feedback, as it is used throughout this disclosure, is defined as knowledge gained regarding an event, action, or process, for example, after at least partially occurring.

Various aspects of the present disclosure will now be described in detail, without limitation. In the following disclosure, a sales and marketing assistance system using predictive analytics will be discussed. Those of skill in the art will appreciate alternative labeling of the sales and marketing assistance system using predictive analytics as a marketing system, event-based sales facilitation system, machine learning sales and marketing system, the invention, or other similar names. Similarly, those of skill in the art will appreciate alternative labeling of the sales and marketing assistance system using predictive analytics as a marketing and sales method, intelligent machine learning supported sales method, data facilitated sales and marketing method, method, operation, the invention, or other similar names. Skilled readers should not view the inclusion of any alternative labels as limiting in any way.

Referring now to FIGS. 1-9, the sales and marketing assistance system using predictive analytics will now be discussed in more detail. The sales and marketing assistance system 110 using predictive analytics may include a database 130, fetch component 200, parse component 300, analytic component 400, insight component 500, dashboard component 600, mapping component 700, contact management component 800, review management component, messaging component, and additional components that will be discussed in greater detail below. A sales and marketing assistance system using predictive analytics may operate one or more of these components interactively with other components for assisting sales by leveraging predictive analytics. One or more of the components included by the sales and marketing assistance system 110 may be operatively connected to the database 130 via a telecommunications network 120. Additionally, an interface 140, such as may be provided by a dashboard component 600, may be accessible via a computerized device communicatively connected to the sales and marketing assistance system 110 via the network 120.

Generally, a system enabled by this disclosure may assist with predicting the likelihood of a homeowner or other prospective customer becoming an actual, current customer for business. Throughout this disclosure, techniques to assist the conversion of prospective customers into actual customers will discuss the application of machine learning to assist with locating and assisting the sales approach for prospective customers. Scoring will be discussed to indicate which prospective customers are likely to become actual customers. Additionally, analytics will be discussed regarding events that may relate to prospective customers and may increase the demand for these prospective customers to engage in services provided by a business.

Examples provided throughout this disclosure will be discussed in the context of contractors, carpenters, and home repair professionals and the services being provided in the context of maintenance and repair work due to an event such as a storm, hail, or other happening that would be a parent to a person of skill in the art after having the benefit of this disclosure. The choice to use such context is in the interest of illustrative purposes and examples of how such a platform will work and is not intended to limit this platform to only home repairs or similar businesses. Instead, the inclusion of examples in this context is provided as a clear example of how such a platform may work. Those having skill in the art will appreciate additional platforms, services, professionals, prospective customers, target audiences, and other applications then may benefit from this disclosure, which is intended to be included in the scope of an invention enabled by this disclosure.

As will be made more apparent throughout this disclosure, a system enabled by this disclosure may provide businesses with tools to identify and pursue business transactions with prospective customers. These tools may be operated over various components of such a sales and marketing assistance system, which may be operated as computer instructions read from electronic memory and/or a computer storage device, which may be operated on a computerized device including a processor and provided to a user via a display that may be included by a computerized device. For example, computer instructions may be stored on electronic media, processed by computerized devices via its central processing unit or other processor, the results of which may be stored as extracted information, derived information, and other information in the storage media and/or displayed to a user via a display. A display may be attached to a computerized device, such as a smartphone, laptop computer, other computer, or other electronic device that would be apparent to a person of skill in the art after having the benefit of this disclosure.

The database will now be discussed in greater detail. FIG. 1 highlights examples of the database, which may also be shown in other figures. Data and information may be included in a database 130. Data may be retrieved from various sources via a data warehouse, which may be stored in and/or accessed from the database 130, without limitation. By providing a data warehouse and storing at least part of the data accessible via the data warehouse in a database 130, business intelligence operations may be performed on the data and information to analyze the data and information to make a useful product that may be presented to customers. The database 130 may facilitate a system enabled by this disclosure in fetching or otherwise sourcing data, storing the data, parsing the data, analyzing the data, deriving insight from the data, and otherwise using the data to produce a useful product of information. At least some of the data and information included by the database 130 may be stored with redundancy, with additional copies being storable locally and/or on a network-connected storage system.

By including access to a database 130 in a system enabled by this disclosure, fetch data may be cleansed, transformed, cataloged, and otherwise conditioned such that it may provide useful information for customers and users. Useful information may include information that is extracted, derived, predicted, or otherwise produced using the data and/or other information. Additionally, data and information included by the database 130, which may be at least partially provide via the data warehouse, may be used for data mining, decision support, predictive analytics, and conditioning to be used with business intelligence tools, such as those that may be provided by a system enabled by this disclosure.

The database 130 may store and distribute data using various approaches, as will be appreciated by those of skill in the art. For example, data and information may be organized using a dimensional model. In this example, data may be partitioned into facts which may be organized as dimensions. By including a dimensional model, data and information may be organized in such a way to facilitate understanding of the useful metrics included by the data and/or information, which may be retrieved from the database 130 by a user quickly. Use of a dimensional model may additionally provide context to the facts included by the database 130, as it may relate to data and information storable by the database 130.

In another embodiment, data and information may be storable in a database 130 using a normalized approach. In this embodiment, data and information may be grouped together by subject area and may be arranged in tables and/or other organizational structures that would be apparent to a person of skill in the art after having the benefit of this disclosure. Data and information storage using a normalized approach may include linking between multiple tables.

The database 130 may be designed using a number of approaches, such as a bottom-up design, top-down design, hybrid design, and/or another design that would be appreciated by those of skill in the art. The database 130 may also include characteristics to help with defining the data and information included by the database 130, for example integrated characteristics, temporal characteristics, subject-oriented characteristics, non-volatile characteristics, and other characteristics that would be appreciated by those of skill in the art.

The data warehouse and/or database 130 may use various data and information storage structures, for example according to a database schema. In one example, information included by a database schema may be grouped. An example will now be provided to illustrate a possible grouping structure, without limitation. Those of skill in the art will appreciate additional and/or alternative grouping structures consistent with the scope and spirit of this disclosure. Example groups may include Accounts, ServicesMaster, Services, ActivityServices, Contacts, Activities, Conversations, Appointments, Sales, ConversationMessages, ActivityReads, ActivityIndicators, ActionLog, CommunicationPortal, Files, PredictivePortals, Notes and/or additional groups.

In one illustrative database schema, information held within the database 130 may be broken into blocks. For example, a block may include 255 characters without limitation. However, skilled artisans will appreciate different configurations of blocks that can include different numbers of characters which may or may not correlate with bytes or combinations of bytes storable in memory of a computerized device. In one embodiment, if information to be stored requires more space than available from a block, the information may be stored as a reference and/or chain for messages that are broken up. And this configuration, the blocks may include pointers to other blocks housing the desired information or otherwise storing information.

In an illustrative accounts group, information may be held regarding an account such as an ID number, associated company, affiliation with a parent account, service radius, geographical information regarding the account, time zone, date the account was created, logo affiliated with the account, and other information that will be appreciated by a person of skill in the art after having the benefit of this disclosure.

In another illustrative group for contacts, information may be held regarding a contact such as an ID number, an account ID number, contact information including email and phone number, address, name, latitude and longitude, IDs for additional services provided through a platform enabled by this disclosure, status indicators, activity history, information relating to a co-owner, and other information that would be appreciated by a person of skill in the art after having the benefit of this disclosure.

In another illustrative group for conversations, information may be held regarding current and prior conversations with a contact or other user, for example, conversation ID, status, channel through which the conversation is conducted, bot interaction or automated conversation through computerized technology, read receipts, last read date, association with other messaging platforms, flagging, and other information that would be appreciated by skilled artisans after having the benefit of this disclosure.

In yet another illustrative group for activities, information may be held regarding activities relating to a contact, event, or other consideration for which information may be stored. Examples of information held regarding activities may include an activity ID, account ID, a type of activity, what type of inquiry into the activity, updates regarding the activity, appointment dates, name information, address, contact information including phone and email, latitude and longitude, referral source, external ideas associated with the activity, information identifying computer applications that may interact regarding the activity, and other information that would be appreciated by a person of skill in the art after having the benefit of this disclosure.

The above example database schemas and information are provided in the interest of clearly describing an aspect of an invention that could be enabled by this disclosure. Those skilled in the art will appreciate additional information that may be held relating to other blocks, groups, and other information repositories consistent with the scope and spirit of this disclosure. The above examples are not intended to limit information that may be held by groups, blocks, or other aspects of a database schema. Similarly, additional information may be associated with groups, blocks, and other aspects of the database schema without limitation.

In one example, data and information may be organized in buckets. As will be appreciated by those of skilled in the art, buckets may provide additional storage features for data and information included by a database 130. Data may be organized into buckets, such as may be provided by bands or segments of data and/or information, which may be used for driving information relating to the distribution of data within the data storage feature. Such information may be made possible by utilizing buckets, which may be presented via a histogram or other tool that may give insight into the distribution of data in a column or other organizational structure of the database 130 and/or data warehouse.

Access to the data warehouse, database 130, and/or other data storage structure may facilitate the exchange of data and information between connected components of a system enabled by this disclosure. For example, the fetch component 200 may communicate data with the data warehouse that is fetched from external sources, which may be stored via a database 130. In another example, the parse component 300 may be operatively connected to the database 130 to retrieve data sourced from the fetch component 200 and provide the extracted information produced by parsing the data. Additionally, the analytic component 400 may be operatively connected to the data warehouse and/or database 130 to retrieve data fetched using the fetch component 200 or extracted information parsed from the data via the parse component 300 to produce derived information, which may be storable in the database 130.

An insight component 500 may be operatively connected to the database 130 to evaluate and compare existing data and information to make predictive analytics that may be useful to a user in making a commercial or marketing decision. Predictive information may be influenced by data fetched by the fetch component 200, extracted information parsed from the data by the parse component 300, derived information determined by the analytic component 400, and other information that may be included by the database 130 or other data storage structures. Those having skill in the art will appreciate additional data and information that may be included by the database 130 and/or accessible by the database 130, which are intended to be included within the scope of this disclosure.

In one embodiment, a data warehouse and/or database 130 may be provided via multiple instances. As will be appreciated by those of skill in the art, an instance may be a set of memory structures that assist in managing database files. The instances may assist with managing the physical file stored on one or more disc on which the database 130 is stored and may assist with serving such data and information to users when demanded.

In an additional embodiment, the database 130 may include one or more traditional databases that may be accessible by a system enabled by this disclosure via a network. The traditional database may include features of a data warehouse and may provide a hybrid data and information storage solution. Skilled artisans will appreciate the various techniques for storing data to be used by a system, including structures other than data warehouses and databases, after having the benefit of this disclosure. It is intended that such additional techniques for storing data be included in the scope of this disclosure, without limitation. The above examples of data warehouses, databases, and other data and information storage techniques are not intended to limit the available possibilities of data and information storage on media accessible locally and/or over a network.

Figure 2:
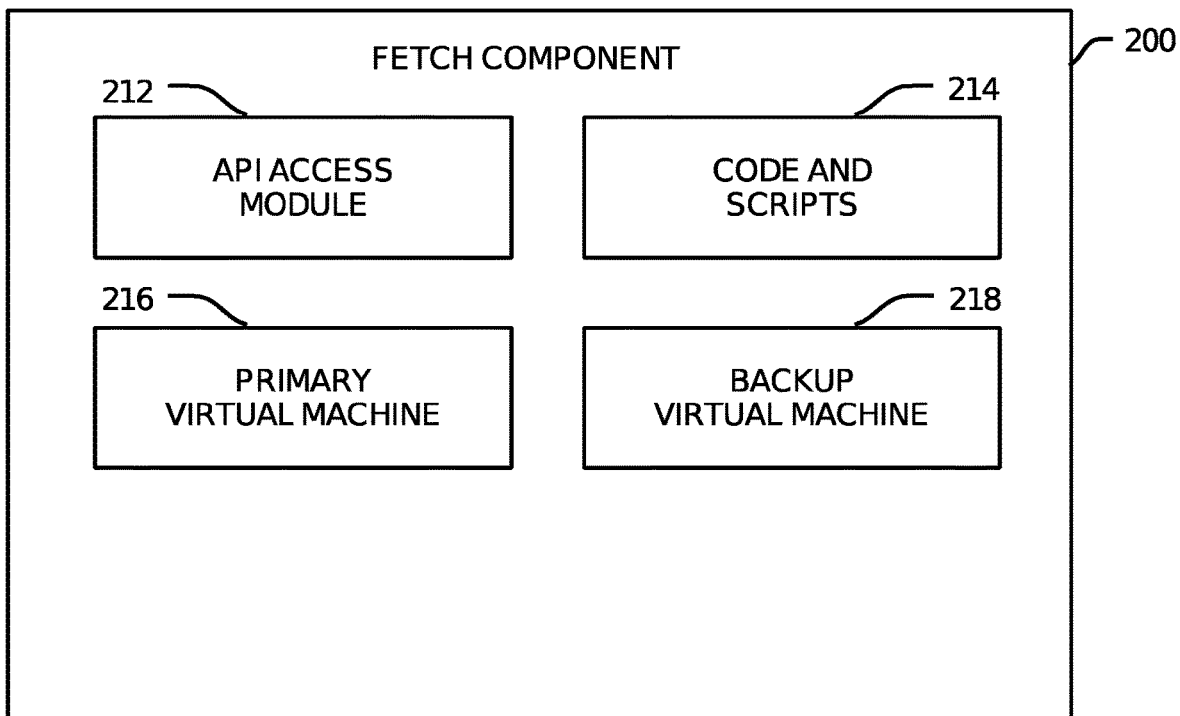
FIG. 2 is a block diagram view of an Illustrative fetch component, according to an embodiment of this disclosure.

The fetch component will now be discussed in greater detail. FIGS. 1 and 2 highlight examples of the fetch component 200, which may also be shown in other figures. The fetch component 200 may advantageously source data fetched from external locations, for example via the data warehouse, to be added to the database 130 for further processing and analysis. Information may be derived from the data fetched by the fetch component 200, such as weather information, event information, customer details, prospective customer demographics, psychographics, and other information that may be useful for determining whether a prospective customer may be likely to convert into an actual customer. The fetch component 200 may operatively connect to one or more external data sources from which data may be fetched. Illustrative systems may include, without limitation, weather information sources, advertising databases, homeowner records, social media, customer spending reports, demographic reports, sales list, and other sources of data that would be appreciated by a person of skill in the art after having the benefit of this disclosure.

The fetch component 200 may retrieve data from one or more source using a data transmission protocol. For example, the fetch component 200 may communicate with an external source via an application programming interface (API), direct connection, public repository, data file, hosting service, or other data source that would be appreciated by those of skill in the art. In an example using an API, the fetch component 200 may operate an API access module 212 to communicate with the data source via the API. Computer code and/or scripts 214 may be operated to facilitate with the fetching of data by the fetch component 200. For example, a script written in Python, C++, Java, JavaScript, C #, and/or another programming or scripting language may provide instructions to the data source to identify and transmit requested data. In examples where permissions are required to access the data from the source, credentials may be included with a request to fetch data to enable the transfer.

In this example, requested data may relate to the occurrence of a notable event, such as a weather event. The fetch component 200 may request such information from a data source such as may be provided by public data sources, private data sources, proprietary data sources, and/or another source that would be appreciated by a person of skill in the art after having the benefit of this disclosure, without limitation. The data fetched by the fetch component 200 may indicate that a hail swath occurred within the last 24 hours as defined by the request. Additionally, the request may seek data relating historical occurrences of a weather event, such as how many events have occurred with a set historical period of time. These periods may be defined by an operator making them request, dynamically by the fetch component 200, as a result of predictive analytics performed by a machine learning assisted operation, or otherwise as would be appreciated by a person of skill in the art. The data request may initially include forecast for future weather events, whether warnings, weather watches, and other notable events that may provide useful data for the other components of a system enabled by this disclosure. Information relating to the intensity of an event may also be requested, such as hail size, rain accumulation, wind speeds, and other information.

The fetch component 200 may be communicably connected to multiple data sources, which may provide complementary data that may be parsed, analyzed, and processed to determine predictive information as to whether a prospective customer may be likely to engage as a customer for a business offering services that may be needed by that prospective customer. For example, the fetch component 200 may be communicatively connected to a source with data regarding an event creating a need, a source with data regarding a prospective condition that may need attention due to the event, and a prospective customer with a purchasing connection relating to the prospective condition. For illustrative purposes, and without limitation, the event may be a heavy storm, the condition may be home damage, and the prospective customer may be a homeowner.

The fetch component 200 may request and/or retrieve information relating to a geographic region in which an event has occurred. For example, the fetch component 200 may retrieve a geographic boundary in which a hail event has occurred. The fetch component 200 may then connect with another data source to determine households and addresses included within the geographic boundary in which the weather event occurred. The fetch component 200 may then connect to an additional data source to determine homeowner information for those addresses in geographic area in which the event occurred. The fetch component 200 may then connect to yet another data source to determine demographic information and customer spending habits relating to the homeowners with homes and the geographic area in which the weather event occurred. This data may be supply to other components of a system enabled by this disclosure to parse information, analyze the data and parsed information to derive other useful information, and gain insight from the data and information to produce predictive information.

The fetch component 200 may operate in an isolated environment, for example, a virtual machine. In one embodiment, multiple virtual machines may be used to ensure operational redundancy and to reduce the risk of a data request being unfulfilled. For example, a primary virtual machine 216 may be established to request data from a source. This primary virtual machine 216 may send a request, pull data from the source, operate computer code and/or scripts to assist with retrieving the data, supply the fetched data to a database 130 operatively connected to the fetch component 200, and perform other operations that would be appreciated by a person of skill in the art after having the benefit of this disclosure.

In this example, a backup virtual machine 218 may also be established to request data from a source. The data request may be made separately from each virtual instance of the fetch component 200 or collectively prior to being distributed to each virtual instance of the fetch component 200. Similar to the primary virtual machine 216, the backup virtual machine 218 may send a request, pull data from the source, operate computer code and/or scripts to assist with retrieving the data, supply the fetched data to a data warehouse and/or database 130 operatively connected to the fetch component 200, and perform other operations that would be appreciated by a person of skill in the art after having the benefit of this disclosure. This operation may be repeated over virtually any number of instances, as the operational requirements of a system enabled by this disclosure may demand.

Figure 3:
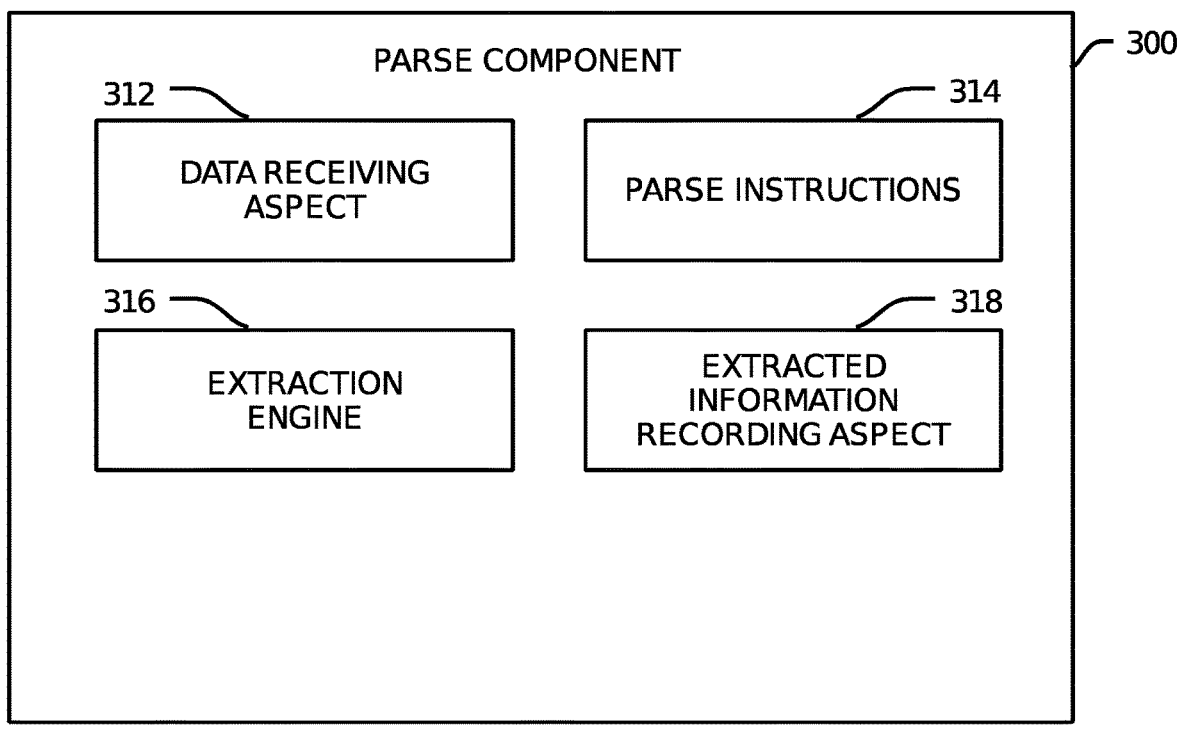
FIG. 3 is a block diagram view of an illustrative parse component, according to an embodiment of this disclosure.

The parse component will now be discussed in greater detail. FIGS. 1 and 3 highlight examples of the parse component, which may also be shown in other figures. The parse component 300 may extract information from the data fetched by the fetch component 200. The parse component 300 may retrieve the data directly from the fetch component 200 and/or from a database 130 communicably connected to the fetch component 200 and the parse component 300. The parse component 300 may examine the data fetched by the fetch component 200 to produce extracted information, which may have enhanced usability by a system enabled by this disclosure to perform additional analytics and derive insight from the data.

The parse component 300 may include a data receiving aspect 312 to receive the data from the fetch component 200 and/or the database 130. The data receiving aspect 312 may include parse instructions and/or scripts 314 operable on a computerized device having a processor and memory to identify and import the data. This data may then be processed by an extraction engine 316 to derive extracted information from the data. For example, the parse component 300 may retrieve raw values from the data fetched by the fetch component 200. This raw data may be processed by the extraction engine 316 to produce the extracted information in a format that is usable by other components of is system enabled by this disclosure.

The parse component 300 may additionally include an extracted information recording aspect 318 to supply the extracted information to the database 130 and/or elsewhere, where it may be made available for other components of a system enabled by the disclosure. Those having skill in the art will appreciate that additional operations and extraction techniques may be performed by the parse component 300 without limitation.

In one example, provided without limitation, the parse component 300 may define an API variable that correlates with a fetched value gathered by the fetch component 200. The parse component 300 may produce extracted information, which may give context to the raw data. Examples of such context may include units, relation to minimum and maximum range values, timestamps, and other information that may be extracted from the data but not made readily apparent from the raw data alone.

Figure 4:
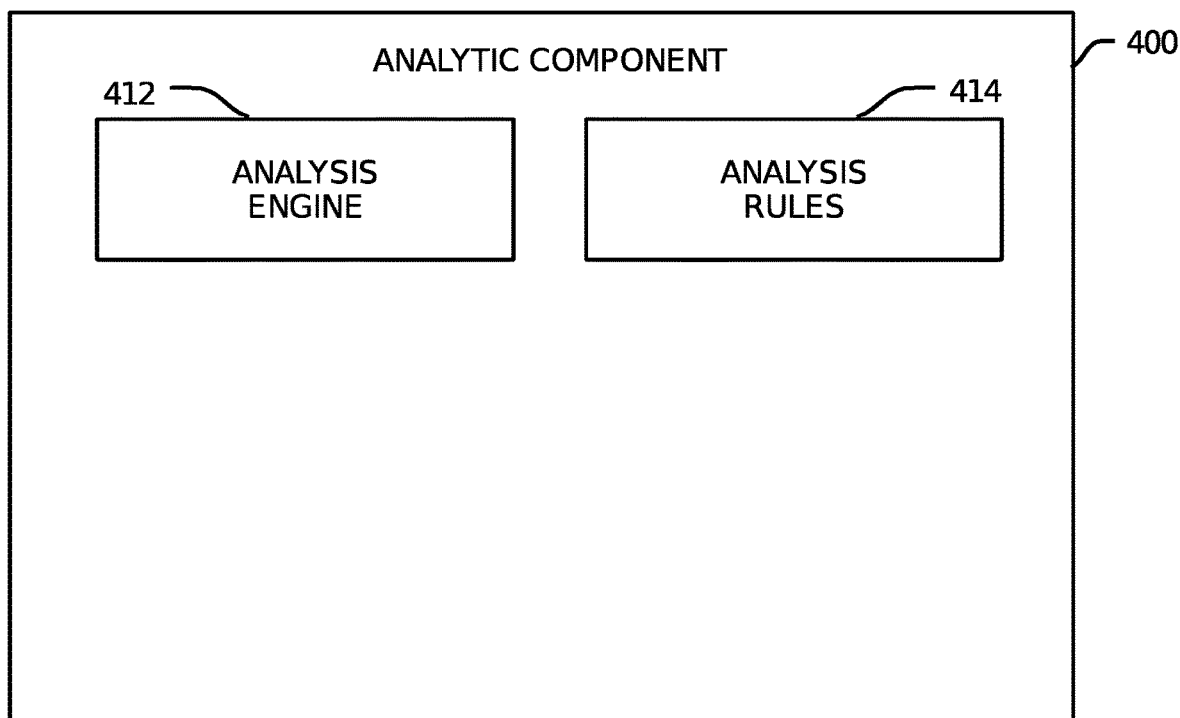
FIG. 4 is a block diagram view of an illustrative analytic component, according to an embodiment of this disclosure.

The analytic component will now be discussed in greater detail. FIGS. 1 and 4 highlight examples of the analytic component 400, which may also be shown in other figures. The analytic component 400 may derive information from data and extracted information to provide further useful context regarding an event, prospective customer, or likelihood of converting the prospective customer into an actual customer. The analytic component 400 may include an analysis engine 412 to gain insight from data fetched by the fetch component 200 and information extracted by the parse component 300.

The analysis engine 412 may provide additional details determinable by analyzing the data and/or the extracted information produced from the data. The analysis engine 412 may apply analysis rules 414 to the data and/or the extracted information to produce additional derived information from the relationship between various data points and/or at least part of the extracted information. This derived information may be indicative of patterns defined by the analysis rules 414 that may lead to useful details not otherwise provided by the raw data or merely by the extracted information produced from that data.

In one example, the analytic component 400 may include aspects of a weather engine 516 to determine derived information from multiple data points and extracted information related to a weather event. In at least one embodiment, this derived information produced by the analytic component 400 may be different from, and supplemental to, hail and other weather information supplied by user reporting. The weather engine 516 may apply analysis rules when analyzing the weather data and information extracted from that weather data to derive additional information. In a more particular example, provided without limitation, the weather engine 516 may receive data relating to hail reports in different geographic boundaries, time stamps, cloud cover, wind speed, and other details provided by the data and information extracted from the data.

In at least one embodiment, the weather information may be received by the weather engine 514 from a source such as a public data source, private data source, proprietary data sources, API-connected data sources, and/or other source. User reported information may additionally be provided by users and/or other operators to supplement the weather information retrieved by the weather engine 514. This weather data and/or extracted information produced from the weather data may be analyzed according to analysis rules to drive additional details such as storm size, storm path, duration, intensity, number of households affected by a storm, number of persons affected by a storm included within those households, and other information that may be useful in determining a likelihood whether a prospective customer may need the services of a user of a system such as that enabled by this disclosure.

In one embodiment, aspects of the analytic component 400 and the parse component 300 may be operated in a shared module. In this embodiment, data may be parsed and analyzed to determine information that includes extracted information from the data and derived information produced by applying analysis rules to the data. In this embodiment, a common extraction and analytic process may be performed on the data substantially simultaneously, in series, in parallel, or in another pattern that would be appreciated by a person of skill in the art after having the benefit of this disclosure. This embodiment is provided as an illustration of one possible combination of components as enabled by this disclosure and is not intended to limit a system enabled by this disclosure to only this example.

Figure 5:
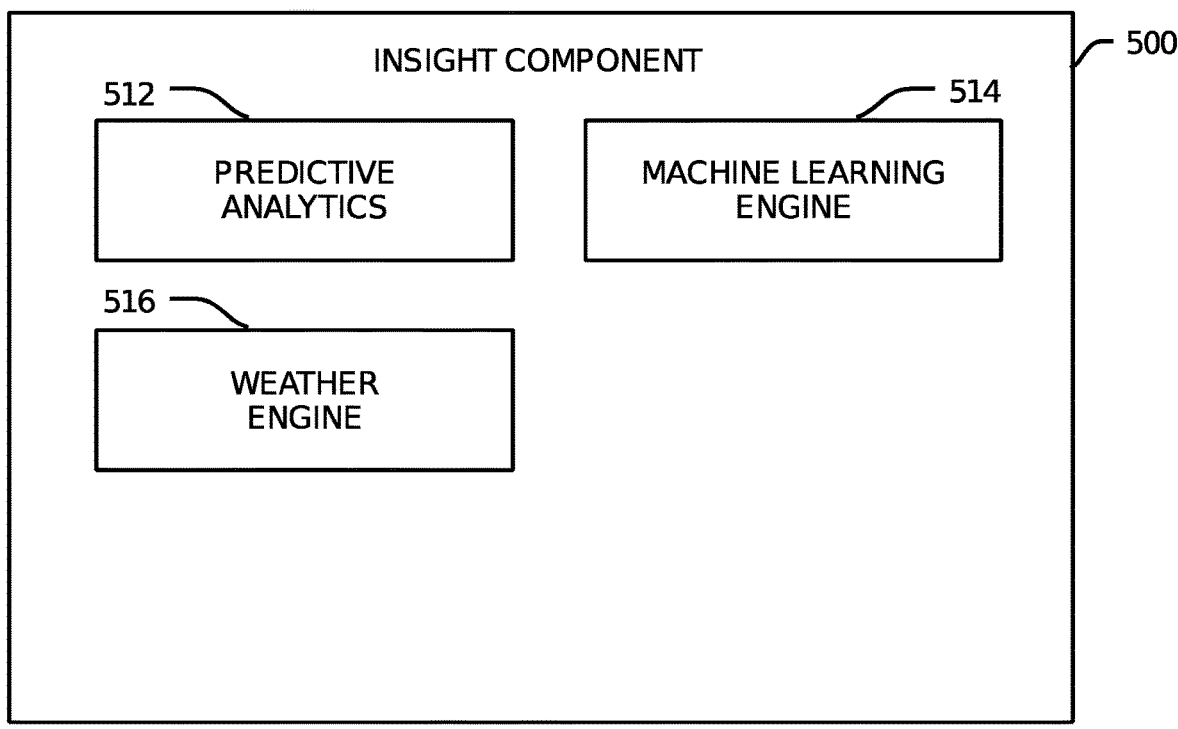
FIG. 5 is a block diagram view of an illustrative insight component, according to an embodiment of this disclosure.

The insight component will now be discussed in greater detail. FIGS. 1 and 5 highlight examples of the insight component, which may also be shown in other figures. The insight component 500 may assist with producing predictive information from other available data and information. The insight component 500 may advantageously draw correlations between different data sets, extracted information, derived information, and other sources of information in data that may assist in gaining a perspective for a situation. The insight component 500 may include a predictive analytics engine 512 to draw correlations between various data and information types to derive new and useful information. A machine learning engine 514 may be provided to assist the predictive analytics and other operations of the insight component 500. Aspects of the weather engine 516 may also be included by the insight component 500 to derive information and make predictions regarding prospective customers, needs of those prospective customers, and they likelihood of converting the prospective customers into existing customers.

The predictive analytics engine 512 may assist with predicting prospective customers from given data, extracted information, derived information, and/or other sources. The predictive analytics engine 512 may advantageously draw correlations between data and/or information, which may assist in detecting trends, opportunities, likelihoods, and/or other insightful and predictive information.

In one example, the predictive analytics engine 512 may receive information regarding weather, for example from a weather engine 516 which will be discussed in greater detail below. The predictive analytics engine 512 may also receive information regarding households located in a defined geographic area, information regarding those households such as homeowners and their demographics, psychographics, and/or other useful information that would be appreciated by a person of skill in the art after having the benefit of this disclosure. The predictive analytics engine 512 may evaluate these factors to detect correlations between the factors indicative of predictive information that may assist a user in identifying, engaging, and converting prospective customers.

With regard to identifying prospective customers, the insight component may advantageously draw correlations between receive data and other available data and information that may assist with determining prospective customers based on location, need, demand, receptiveness to sales by a user, and sales approach. For example, and given without limitation, a user subscribing to a system enabled by this disclosure may define a geographic area in which the user wishes to market their services, such as home repair or contractor services. The condition may occur to increase the likelihood of occupants of the defined geographic area needing the services of the user, for example, a severe weather event affecting households within the defined geographic boundary. The insight component 500 may identify households located within the geographic boundary affected by the event, for example, the severe weather event. The insight component may gather this information as extracted information from the parse component, derived information from the analytic component 400, or as data received from an external source via the fetch component 200. Those having skill in the art will appreciate additional techniques in which information may be received by the insight component 500 after having the benefit of this disclosure, which is intended to be included within the scope and spirit of this disclosure.

The information received by the insight component 500 may include details relating to households associated with the physical homes located within the defined area. This household information may include details regarding the occupants, ages, children, home value, home age, and other information that would be appreciated by a person of skill in the art after having the benefit of this disclosure. This occupant or homeowner information may be associated with information about the home, property, and structures on the property to make weighted assumptions about the homeowner or other person who may engage in business with a user of a system enabled by this disclosure. These assumptions may be reflective of correlations between psychographics associated with the homeowner, information associated with the home itself, and other factors that could contribute to the likelihood of conversion of a prospective customer into an actual customer.

The insight component 500 may include a machine learning engine 514 to assist with the correlations and extraction of predictive information from the data, extracted information, derived information, and other details provided to the insight component 500. The machine learning engine 514 may analyze data and information to detect patterns. These patterns may be indicative of a result likely to occur given a combination of conditions.

To enhance the efficacy of predictive information that may be produced with the assistance of the machine learning engine 514, the machine learning engine may be trained, as we will be understood by those of skill in the art. For example, the machine learning engine 514 may be provided case studies of weather events, household types, property details, homeowners, demographics, psychographics, and other information that may be correlated by the insight component 500. The machine learning engine 514 may evaluate this data and information to detect patterns of predictable outcomes given various combinations of the input conditions.

The output of the machine learning engine 514 may be fed into a feedback loop to judge the efficacy of each prediction. If a prediction by the machine learning engine 514 provides an advantage to the machine learning model operated by the machine learning engine 514, that advantage may be weighted to increase it likelihood that such an outcome will be repeated given similar input characteristics. Conversely, if the prediction by the machine learning engine 514 provides a disadvantage to the machine learning model, such as by making a prediction inconsistent with the actual outcome, such predictions may be provided a negative weight to decrease the likelihood of such predictions being repeated in subsequent iterations given similar input characteristics.

In one example, provided without the intent to limit a system enabled by this disclosure in any way, the machine learning engine 514 may be provided input characteristics that a major storm event passed through a geographic boundary such as a subdivision, township, county, or other defined area, homes located within that area, demographics, and/or psychographics related to the homeowners associated with those homes. Information relating to the weather event may indicate that a hailstorm produced one quarter inch hail that fell for approximately 15 minutes. Information relating to the homes in the geographic area may identify that 20 homes are located within a bounded area. Additional information relating to these homes may identify that five of such homes are ranch homes with large surface areas of roofs exposed to the hail event. Further information may be supplied indicating that the homeowner of one of these ranch houses has a large discretionary income, frequently makes purchases related to the upkeep of their home and may be due for roof replacement for repair. In this example, the machine learning engine 514 may process this information through the machine learning model to determine possible outcomes given the input conditions. The outcomes may be weighted based on historical data to determine a likely outcome scenario, which may indicate that the homeowner experiencing hail damage may be in the market for a contractor to replace their roof or make other repairs to a structure.

The machine learning engine 514 may additionally identify other potential needs of a prospective customer by comparing additional input characteristics to detect patterns and other likely output conditions. For example, the machine learning engine 514 may include information supplied regarding internet search history, credit card purchase history, social media profiles, public communications, online engagements, and other information that may provide useful details to assist the machine learning engine 514 with drawing correlations and making predictions. In this example, the machine learning engine 514 may detect a pattern that the prospective customer has recently been searching for answers regarding electrical work. The machine learning engine 514 may then indicate that the prospective customer may need assistance not only with repairing the roof that may be damaged during the weather event but may also need subsequent work by the contractor regarding other projects relating to the prospective customer's house. As seen in this example, the insight component 500 may advantageously increase the chances of not only identifying prospective customers, but also identifying an increased array of needs for that prospective customer for the services of a user of a system enabled by this disclosure.

The insight component 500 may include a weather engine 516, which will now be discussed in more detail. As will be appreciated by a person of skill in the art, the weather engine 516 may additionally operate with other components of a system enabled by this disclosure. For example, the weather engine 516 may operate with the assistance of the fetch component 200 to retrieve data from a third-party source, such as a public and/or private weather data source, without limitation. The weather engine 516 may additionally operate in assistance with the parse component 300 to extract information from the data retrieve through the fetch component 200 that may be useful by other aspects of the insight component 500, such as the predictive analytics engine 512 and/or the machine learning engine 514. Weather data fetched by the fetch component 200 and/or extracted by the parse component 300 may be analyzed by the analytic component 400 to produce derived information that may also assist in the operation of the insight component 500. In one embodiment, this information may be processed by the weather engine 516 as a function of the insight component 500, without limitation.

The weather engine 516 may assist with identifying weather events relating to a geographic boundary or area. The weather engine 516 may additionally generate information relating to a weather event from data parsed from outside sources, third-party repositories, and other sources of data relating to weather events. For example, the weather engine 516 may identify the occurrence of hail, wind, storm, or other significant weather events for a given area. The weather engine 516 may then associate those events with a probability that homes or other property were damaged by the weather event. The weather engine 516 may predict potential customers at least partially based on these analytics.

The weather engine 516 may work in coordination with a mapping component 700 to identify an area in which to provide the analytics. For example, the mapping component 700 may identify an area by drawing a shape or other boundary around said area. In one example, the mapping component 700 may substantially automatically create the boundary based on information derived from the weather data. In another example, the mapping component 700 may receive inputs from a user to manually identify at least part of the boundaries subject to the analysis. In yet another example, the area covered by a boundary may be adjusted based on a subscription level of a customer, rules relating to the analytics, or other modifications made by an operator of the system, the system itself, the user, customer, or other party that may affect the analytics. This information may be displayed to a user of the dashboard component 600 or another interface that would be apparent to a person of skill in the art after having the benefit of this disclosure.

In one example, provided in the interest of clearly describing one possible configuration of a system enabled by this disclosure, the weather engine 516 may receive and evaluate details relating to major weather events, household details, public information, customer supplied information, historical information, and other information that may be useful for predicting the likelihood of a prospective customer engaging in commerce with a user of a system enabled by this disclosure. Weather information may include details about a weather event, such as relating wind, temperature, storm intensity, precipitation, hail, and other weather details that may be relevant to assessing the likelihood of a prospective customer engaging in commerce with a user. Household details may include information such as home age, building size, roof characteristics, structural details, sales history, property tax history, inspections, insurance details, insurance claims, administrative reports, building code violations, building permits, and other information that may relate to a home or property associated with the home. Public information may include details relating to the home such as described above, the homeowners, transactional history relating to the home, maintenance history for the home, information relating to the homeowners publicly available, and other information that may be located and/or accessed by a component of a system enabled by the disclosure, for example, as retrievable by the fetch component 200.

In this example, the insight component 500 may weigh the influence of each of these characteristics relating to a home, event, and prospective customer to determine a probability of such a customer needing the services of a user of a system enabled by this disclosure. The insight component 500 may produce a score for prospective customer to provide easily accessible and comparable metrics indicating the value of a prospective customer from a business perspective. For example, the insight component 500 may assist with generating a match index for a prospective customer, which may indicate to a user of a system enabled by this disclosure the value of pursuing a business relationship with a prospective customer. In at least one embodiment, generation of a match index may be performed by or in coordination with the contact management component 800, which will be discussed in greater detail later in this disclosure. The user may compare match indices assigned to various prospective customers to prioritize which prospective customer to pursue a business relationship with.

In a more particular example, provided without limitation, the insight component 500 may determine that a strong weather event passed through a geographic area in which a household was located having a large roof surface area and owned by a person with a large discretionary income. The insight component 500 may determine additionally that the occupant of such a household has recently been searching for roof contractors to fix hail damage. The insight component 500 may draw correlations between the weather event, the household, the homeowner, and the homeowners needs to predict that the homeowner is a prospective customer with a high demand for a user service. In this example, the insight component 500 may assign a favorable lead score to this prospective customer.

In another example, the insight component may receive information regarding a strong weather event passing through a geographic area in which an apartment complex was subject to a hail event. In this example, the insight component 500 may identify a homeowner within that apartment complex having a high disposable income and psychographic information that indicate a likelihood to be receptive to marketing or sales from the user, however the homeowner may be identified to be located in a middle floor and thus not have a roof that would need to be repaired. In this example, the insight component 500 may assign a negative weight to this prospective customer and may associate a lower match index. A user may view this match index and details relating to the prospective customer and choose not to engage in sales attempts with this prospective customer.

In yet another example, the insight component may identify a weather event in a geographic area, a home located in that geographic area that may have been damaged by the weather event, and that the home is occupied by a family associated with that home's address. However, the insight component may determine that the listed occupant is not the homeowner. For example, the listed occupant may be a renter renting from the homeowner. This identification may be assisted by the machine learning engine 514 and/or the predictive analytics 512 provided by the insight component 500. In this example, the occupant of the home may be given a lower match index since the occupant does not have decision making power as to which contractor would perform repair work on any potential damage of the household. Additionally, the insight component 500 may apply predictive analytics to search data and information to identify the homeowner, which may be a better prospective customer with a higher likelihood a conversion into an actual customer. In this example, the insight component 500 may recommend a user to contact the homeowner, which may be the landlord in this example, and assign a match index to the homeowner as described in the other examples above.

Figure 6:
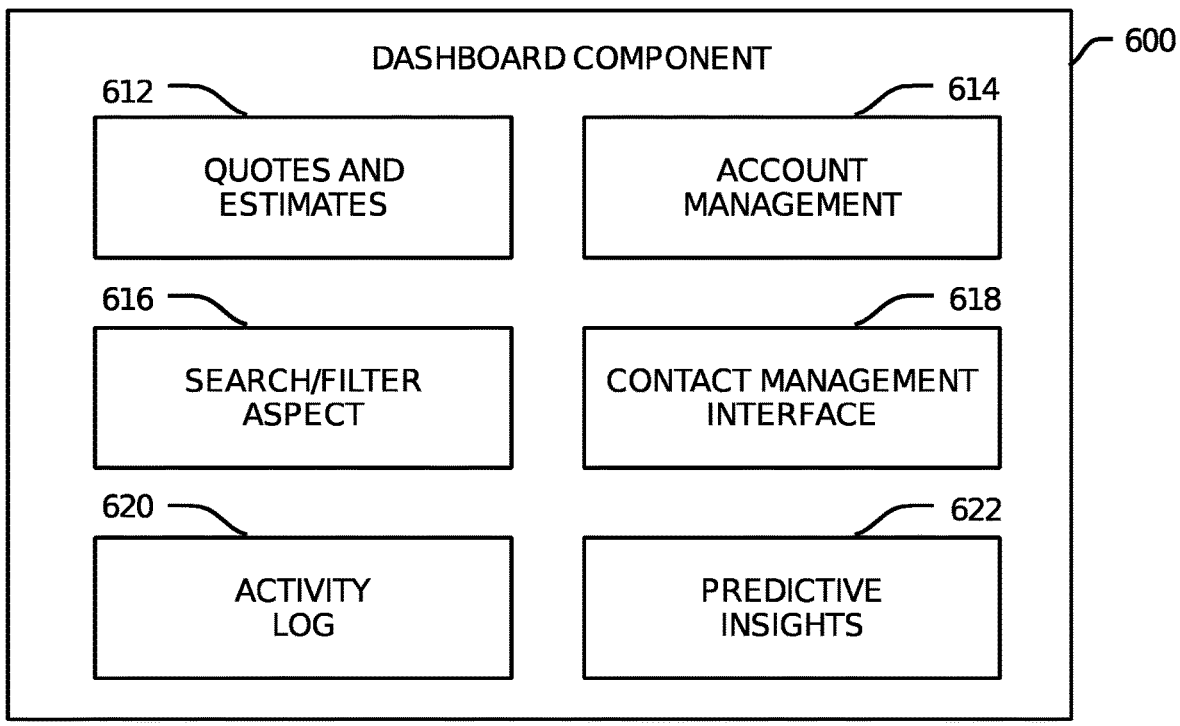
FIG. 6 is a block diagram view of an illustrative dashboard component, according to an embodiment of this disclosure.

The dashboard component will now be discussed in greater detail. FIGS. 1 and 6 highlight examples of the dashboard component, which may also be shown in other figures. The dashboard component 600 may provide an interface for a user enabled by this disclosure. For example, the dashboard component 600 may include access to an interface, a quotes and estimates aspect 612, an account management aspect 614, a search and filter aspect 616, contact management interface 618, an activity log 620, predictive insights 622, and other features that would be appreciated by a person of skill in the art after having the benefit of this disclosure. The dashboard component 600 may advantageously provide a tool for a user to access information generated by a system enabled by this disclosure indicative of potential customers and associated likelihoods of such potential customers converting into actual customers. Features of the dashboard component 600 may assist with the identification, engagement, and conversion of such potential customers into actual customers.

The dashboard component 600 may provide an interface featuring multiple functionalities displayed in various panels and/or other areas provided by the interface. In one embodiment, panels may include a contact queue panel, search and filter panel, activity log panel, contact card panel, predictive insights panel, and/or other panels without limitation. Additionally, a panel may include one or more subpanels.

The contact queue panel may include subpanels, such as a sort, contact name, contact information, and score. The sort subpanel may provide information relating to activity by a contact, including a last activity date, most recent activity, and other activity information. Recent activity may be sorted and/or resorted to reflect the temporal detail regarding the activity and when such activity occurred.

Additional information may be associated with the contact and displayed through the contact queue panel, such as the data the contact was added, name, contact information such as phone number and email address, physical address, and/or other information. A match index may be associated with a contact to indicate a likelihood of conversion for the contact to become a customer of the party viewing and using the contact queue panel. In one embodiment, the score may be associated with a color coding to quickly and efficiently indicate to a user the likelihood of conversion associated with the contact.

Dashboard elements may be arranged such that the dashboard may be presented to a user via a display. Virtually any programming language may be used to construct the dashboard, for example JavaScript and CSS, as will be appreciated by persons of skill in the art, without limitation. As a user navigates through the features of the dashboard, additional functionality and utilities may be presented to the user respective to the navigation. For example, a user may navigate to a portion of the dashboard showing the flow of communications from prospective customer to the business seeking to engage in business with a prospective customer. In another example, the dashboard may provide predictive analytics, such as an indication as to a likelihood of converting a prospective customer into an actual, current customer.

The dashboard component 600 may provide an interface, application, portal, or their interactive tool for a user to engage with the various features of a system enabled by this disclosure. The dashboard component 600 may examine the credentials of a user to verify access to the system as a whole and control which features, and to which scope such features are permitted for a user to access. The dashboard component 600 may be provided using a web-based interface, without limitation. For example, an online computer application and/or a locally installed computer application may be provided to a user to include various modules, web pages, subpages, sections, and other interface features that would be appreciated by a person of skill in the art. In one example, a web interface may be provided to a user with widgets and modules that may be engaged by the user to access features provided by a system enabled by this disclosure. Interaction with the dashboard component 600 may instruct a system to retrieve information from the database 130, perform calculations on the data and/or information retrieved from the database 130, and store results in the database 130. Those having skill in the art will appreciate additional configurations of a dashboard component 600 interface that would be consistent with the scope and spirit of the disclosure, without limitation.

The dashboard component 600 may include a quotes and estimates aspect 612. In one embodiment, a visual quoting engine may be provided to assess an environment and approximate a cost to provide services relating to that environment. The visual quoting engine may be operatively attached to a physical camera capable of assessing an environment via photographs or video taken of the environment. For example, a camera operatively connected to the visual quoting engine may take a series of photographs of an exterior and/or interior space of a home that has been damaged by a weather event. These photographs and/or videos may be combined to create a unitary view and/or viewed independently of one another to assist with the analysis of the photographs and/or videos. Analytics may be applied to identify information relating to the environment, such as area, object recognition, material recognition, detection of damage, and other useful information that may assist with assessing in quoting a price relating to a service to be provided with respect to the environment.

The dashboard component 600 may include an account management aspect 614, which may advantageously allow a user to maintain or update details relating to a user's account. The account management aspect may include a billing dashboard, which may provide access to users for finance and developer features such as accounts, subscriptions, and upcoming payments, without limitation. Regarding accounts, users may access a page to add a new account, edit an existing account, or otherwise change parameters relating to an account. Users may establish sub accounts, which may be accessed by logging into a primary account. Users may update information in the account including account name, associated sub-users of the account, subscriptions, products, statuses, set up date, account activity status, account name, and other information that would be appreciated by a person of skill in the art that may relate to an account.

For subscriptions, a user having access to this feature may access a page to add an existing subscription, edit an existing subscription, update fields relating to a subscription, and other features that will be appreciated by skilled artisans after having the benefit of this disclosure. Users accessing the subscriptions features may also edit a subscription name, interacting with such may provide the user additional options to edit subscribe subscription information at a subscription page. Users may manage signups, which may allow a user to identify a number of people using a subscription. In this aspect, a user may add seats, remove seats, control user or sub-user permissions, or otherwise make changes to the way an assigned person may use the subscription. The subscription features may include a sorting feature to allow the user to identify and make changes to groups of sub-users or other users associated with the account collectively.

The account management aspect 614 may include upcoming payment features. Using these upcoming payment features, a user may view a list of upcoming payments and fields associated with such list. Fields may include account name, payments made for product or subscription, payment types, payment dates, payment method, accounts associated with payments, renewal status, recurring payments, line item charges, subscription add-ons, overage rates, billing status, cancellation, coupons, discounts, special rates, invites, referral management, API keys, notifications, receipts, and other tools to sort or otherwise organize payment information. Through the payment features, users may provide financial details that may be used to cover subscription, purchase, and other costs associated with interacting with a platform such as one enabled by this disclosure. The account management features may additionally include options to manage personalization features, such as avatar, photo, name, company information, and other personalization information that would be apparent to a person of skill in the art.

The dashboard component 600 may include a search and filter aspect 616. The search and filter aspect 616 may facilitate searching data and information associated with a user, which may be provided from a database 130, as discussed earlier in this disclosure. Searches for data associated with the user may include a last activity date, account activity, name information, predictive match index (PMI) information, contact name, phone number, email address, address, scores, and other information that would be appreciated by those of skill in the art. Regarding activity status, the search and filter feature may facilitate organization of data relating to appointment types, appointment results, team engagements, original match indices, product interest, PMI, and other information. Regarding appointment types, information may be searched and filtered regarding a measure or survey relating to the information, insurance and inspection information, demo and sales presentation information, service and repair information, build information, collection information, and other information. Regarding appointment results, information may be searched and/or filtered relating to customer no-shows, representative no-shows, cancel appointments, rescheduled appointments, appointment runs including demo sale presentation completes, completed measures and surveys, presentations for no shows and no demos, insurance approvals, insurance denials, insurance tendency, contract contingency, inspection results, pricing contract details, contract signatures, sales statuses, collected deposits, collections on final bills, and other information that will be appreciated after having the benefit of this disclosure.

Regarding team engagements, information may be searched and/or filtered regarding various team members, for example a first team member, a second team member, a third member, and/or other team members, without limitation.

Regarding original lead sources, information may be searched and/or filtered regarding a default AI chatbot, a secondary AI chatbot, whether widgets, weather information, phone call information, quote request information, in person lead capture information, and other information that relates to lead sourcing as will be appreciated by those of skill in the art.

Regarding product interest, information relating to customer setup and product listings may be searched and/or filtered regarding and ability to select products and/or services, mutual exclusivity as it pertains to offering of services, roofing services, window services, door services, siding services, gutter services, other contractor services, and/or other services that will be appreciated by a person of skill in the art after having the benefit of this disclosure.

Regarding the predictive match index PMI, information may be sorted and/or filtered regarding match indices, score numbers, score rankings, prospective customer demographics, prospective customer psychographics, prospective customer information, and/or other predictive match index information that would be appreciated after having the benefit of this disclosure.

The dashboard component 600 may include a contact management interface 618, which may work operatively with the contact management component 800, to display information relating to engagement with a contact. A contact may be a prospective customer, existing customer, nonworking relationship, or another person with which a user may contact. For the purposes of this example, the term contact will be used in the context of a prospective customer, without limitation.

The contact management interface may provide the user with information relating to a contact, as may be consistent with aspects of the contact management component 800. For example, a contact management interface 618 may provide information relating to an original lead source, and activity type associated with that lead source, an inquiry type, a name, email, phone number, co-owner name, secondary phone number, and other information relating to a contact. This information may be stored in the database 130 with a prospective customer profile and may be provided to a user on demand via the dashboard component 600.

The contact management interface may provide features to facilitate communication with prospective and/or existing customers. For example, a user may be provided a visual quote to assist with assessing a potential price for engaging in services with the potential customer. A model match index may be provided to a user to indicate a likelihood of a prospective customer converting into an existing customer. A module may be provided to analyze the contents of a home, which may take advantage of photos, videos, images provided by a prospective customer and/or existing customer, or otherwise acquired. Data processing may be applied to the photos and other media used the analyze the contents of a house, for example photogrammetry, as may be provided by a component of a system enabled by this disclosure such as an analytic component 400.

A computer application may be provided that is operable on a computer device such as a smartphone to capture the photographs, videos, and/or other media related to a home or other location for which work may be provided. Information captured from the computer application may be uploaded to a database 130 or another storage location that would be appreciated by a person of skill in the art, without limitation. Additional information may be associated with the media, as may be performed by the analytic engine to produce derived information and/or the insight component 500 to provide predictive information.

The contact management interface 618 may additionally provide information to a user regarding contact engagement, for example, activity, shared files, and other information. Regarding activity, information may be provided to a user relating to activity added to a prospective customer profile, labels, conversations, phone call summaries, quotes, and other information that would be appreciated after having the benefit of this disclosure. Information may be displayed to a user and standard order, reverse order, or another order. Information displayed via the contact management interface 618 may include information relating to activity type, date of the activity, chat conversations, generic information, quote information, and/or other information.

Files may be shared between a contact and a user, which may be stored in and accessed from the database 130 or a connected data warehouse. Shareable files may be images, documents, videos, attachments, and other file types that would be appreciated by skilled artisans. Files may include metadata, for example, timestamps, access dates, file author, view dates, viewers, and other information that could be included as metadata.

A contact card may be included to quickly display important information regarding a contact to a user via the dashboard component 600. The contact card may include information such as a name, sharing features, print option, contact information, best contact method, co-ownership information, address, and other information that may be advantageous to have readily available and easily accessible to a user. The information displayed on the contact card may be customizable by the user. The information display by the contact card may change according to the context of the user, the request made, or other factors that would be appreciated by a person of skill in the art.

A contact map may be displayed with information associated with the contact, such as address, city, state, location, directions, or other information. In instances where an exact address is not known, and address may be approximated. Instances where an address cannot be approximated, the map may be omitted, without limitation.

Additional notes may be collected and/or displayed to a user relating to the contact via the contact management interface displayable via the dashboard component 600. Additional notes may include the representative name of the person assigned to the contact, notes regarding the contact and/or interactions with contact, a button to save the notes into the system, and other features relating to taking and viewing notes regarding interaction with the contact.

The dashboard component 600 may include an activity log. The activity log aspect may include features relating to customer summaries, appointment histories, appointment detail, overall contact engagement, shared files, and other features that would be appreciated by those of skill in the art.

Regarding customer summary features, details may be provided to a user based on a most recent appointment activity, which may include firm appointments and/or tentative appointments, which may be displayed in list format, calendar format, or another format that would be appreciated by those of skill in the art. The customer summary feature may additionally include recent product interest expressed by the potential customer. A recent team interaction may be reported via the customer summary feature. Additionally, proposed next steps in slash or required next steps may be provided to a user that may suggest or mandate additional activity to be taken to further advance converting a prospective customer into a subscribing and active customer.

Regarding the appointment history feature, a user of a system enabled by this disclosure may create, manage, and otherwise interact with appointments in history relating to past appointments. For example, a user may create a new appointment, which may include providing information such as title, appointment type, date and time of the appointment, representative assigned to the appointment, appointment results, sales totals received from the appointment, amount collected from the appointment, and other information. Next steps may be associated with the appointment, such as resuming the discussion had during the appointment with the prospective customer and/or existing customer, follow up appointments created with the customer, instructions to send information to finance for billing aspects relating to the customer, instructions for sending information to production, and other next steps that would be apparent after having the benefit of this disclosure. Information may be organized via the appointment history feature including an address for the appointment, products that the prospective customer is interested in, files associated with the appointment and/or the prospective customer, appointment notes, limits, appointment cancellations, appointment additions, appointment reschedules, and other appointment details. Appointment history may be editable in some embodiments.

The dashboard component 600 may include a predictive insights aspect 622, which may provide a user with information relating to the predictive analytics performed by a system enabled by this disclosure. Some aspects of the predictive analytics aspect of the dashboard component 600 may be selectively enabled to users subscribing to a package or other service that includes access to predictive insights and predictive analytics. For example, a user that does not have an active subscription to predictive insights may be a grayed out or blocked feature-set relating to predictive analytics. An option may be provided to the user to subscribe to additional package or functionality that may enable the access to the predictive analytic tools and view the results of such on the predictive analytics interface. The option to subscribe me included pop-up, redirection to a separate web page, or other interface feature to facilitate the edition a predictive analytics service user account.

The predictive insights aspect 622 may provide information regarding a prospective customer or other contact such as name, share option, print, and other details. This information may be included in a header.

The predictive insights aspect 622 may provide information to a user such as predictive match index (PMI) score, a calculation bar, home information, recent weather information, and other information that would be useful for engaging in a sales relationship with a prospective customer and or assisting an existing customer. The calculation bar may be selectively enabled depending on a subscription level. When enabled, the calculation bar may assist the user with calculating a match index associated with a prospective customer, recalculating the match index, or otherwise determining useful information relating to the prospective customer or other contact. Household information may include details such as square footage, age of a house, insurance status, sales history, contracts associated with the house, inspections, and other information that would be apparent after having the benefit of this disclosure. Additional information may be provided relating to invoices sent to a customer, deposits collected, final bills collected, and other accounting statuses that would be appreciated by those of skill in the art.

The predictive insights aspect 622 may additionally provide information regarding weather as it may relate to a home and/or prospective customer. For example, a recent weather icon may be provided by an interface that through engagement by a user provides information relating to recent weather events. This information may be pulled from the database 130, as may be retrieved by the fetch component 200, extracted by the parse component 300, derived by the analytic component 400, and/or otherwise produced. Weather information may be sorted to show storm events, extreme weather events, specific types of weather events, filtered weather events, and other designation of events.

The predictive insights aspect 622 of the dashboard component 600 may provide a user with information regarding personality of a prospective and/or existing customer, which may be included with a prospective customer profile associated with the prospective customer. This personality information may be indicative of the likelihood of a prospective customer to convert into an existing customer. This personality information may additionally assist with determining an appropriate sales agent to engage with the prospective customer that would have a high likelihood of relatability with the prospective customer, and thus an enhanced likelihood of conversion of the prospective customer into an existing customer, for example, as compared to other sales agents. Historical information relating to predictive summaries and other information provided through the predictive insight interface of the dashboard component 600 may be provided, without limitation.

Figure 7:
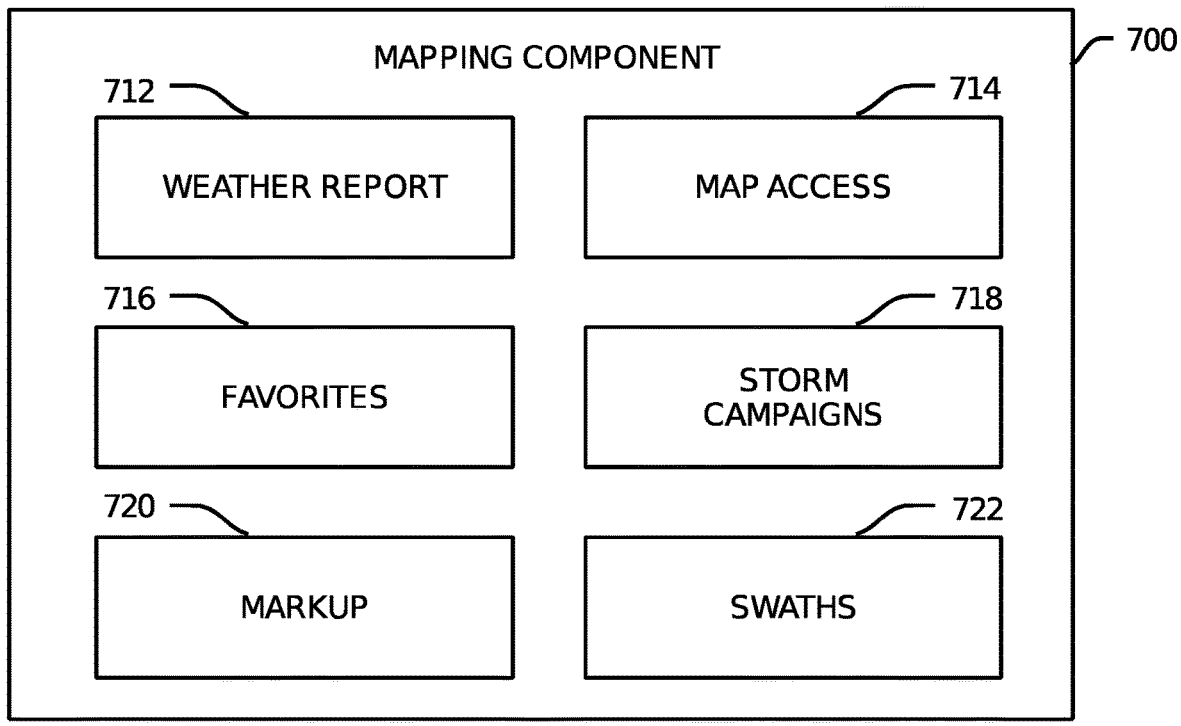
FIG. 7 is a block diagram view of an illustrative mapping component, according to an embodiment of this disclosure.

The mapping component 700 will now be discussed in greater detail. FIGS. 1 and 7 highlight examples of the mapping component 700, which may also be shown in other figures. The mapping component 700 may include various aspects that may work together to facilitate presenting data and information included by the database 130 to a user via a graphical map interface. Results produced by the mapping component 700 may be displayed to a user through the dashboard component 600, without limitation. The mapping component 700 may include aspects such as a weather report aspect 712, a map access aspect 714, a favorites aspect 716, storm campaigns aspect 718, markup aspect 720, and swaths aspect 722. Skilled artisans will appreciate that additional embodiments may be provided that include more or fewer aspects and/or functionality than provided in this example, without limitation.

Regarding the weather report aspect 712, information may be drawn from the database 130 to indicate a weather event that may have occurred. For example, parsed data produced by the parse component 300 and/or derived data produced by the analytic component 400 may be used to determine useful information regarding a weather event. Additionally, data acquired by the fetch component 200 may be used to supplement the information provided to the weather report aspect 712.

In one example, data may be fetched from a national weather report, such as may be provided by a public and/or private weather data source, regarding a weather event. This data may relate to one or more recent storms that passed through a geographic area. For example, historical data relating to a past number of storms such as 30 storms may be identified across a geographic region. Precision may be defined by filtering storm types, geographic regions, locations, or other parameters that would be appreciated by a person of skill in the art after having the benefit of this disclosure.

For example, weather report information may be displayed relating to storms passing through the Chicago and suburban areas, which may be a target market for a user. The weather report aspect 712 may display the last requested number of storms, for example last 30 storms without limitation, to provide historical context to the types and prevalence of storms that may pass through an area. Additional information may be provided to supplement the weather data, for example, number of households within the reported area. Information relating to these households may also be provided, as discussed above.

Features may be provided to a user to interact with the information provided by the weather report aspect 712 of the mapping component 700. For example, labels may be applied to one or more households in an affected area. In another example, labels may be applied to a weather event or weather trend in an area. Interactive features may be provided, such as clickable features, touch features, interactive icons, hover, mouse over, or other features that would provide additional information and/or context to information otherwise provided by the weather report aspect 712.

In an example operation, a storm event may be selected for view. The mapping component 700 may be opened and directed to the weather report aspect 712 to display the storm event. The map provided by the mapping component 700 may be zoomed to a company a geographic boundary in the designated area. A swath may be displayed to reflect information relating to a storm event, such as date, intensity, area, and other details that would be appreciated by a person of skill in the art. A date picker may be provided so that a user may select historical information, past information, real-time information, predictive future information, and/or other information relating to a storm event. Other features may be provided to assist with the interactivity of the mapping component 700 and the weather aspect to facilitate delivery of information to a user.

Information may be provided relating to a number of homes in an affected area. For example, an indication may be included by the mapping component 700 relative to the number of homes in a designated area. Optionally, this number may be rounded to reduce cluttering on a display. For example, the value of 102,672 homes may be abbreviated as 102k homes. Those of skill in the art will appreciate that various rounding techniques may be applied, without limitation. A label may be applied to the displayed information to give context, for example, "homes affected." Storm event date information may also be provided, for example, Oct. 12, 2020. Labels relating to a specific type of weather event may be applied, for example hail size, wind speed, precipitation accumulation, and other information. Information may be provided as approximations, ranges, bounded values, discrete values, and otherwise without limitation.

The mapping component 700 may include a map access aspect 714 to facilitate interaction with the map and follow up activities relating to the map. For example, the map access aspect 714 may include a view map button. Upon interaction with the view map button, a call to action may be provided to a user with options to perform a behavior related to the information displayed on the map, such as contacting a homeowner with a house identified within a bounded area.

Zooming features may also be provided so that a user may control a level of detail, viewable area, information resolution, and other aspects. Interface features may be provided to allow quick zooming to the regional level, national level, level of a bounded subscription area, local level, household level, storm level, or other level that will be appreciated by a person of skill in the art. Substantially real-time swath information may be displayed, as will be discussed in more detail below with the swath aspect 722.

A marketing feature may be provided by the map access aspect 714 of the mapping component 700, which may provide functionality for the call to action features. For example, a call to action box may be provided to facilitate taking action relating to information received from a map. The call to action button may provide a message to a user to facilitate operation of the map, such as, "click over your map to see historical, real time, and forecasted weather events for the entire nation."

A favorites aspect 716 may be provided by the mapping component 700 to quickly provide a user access to favorite features, prospective customers, geographic areas, storm types, or other favorite types of interaction of a user, without limitation. Favorites may be organized in one or more lists, which may include one or more sub-lists. A default list may be provided with common favorites. Entries included by the default list may be selectively produced via manual entry, machine learning, user selection, or otherwise.

In one example, a favorite list may be created and labeled, for example, as "business main address." This list may include information approximate to a geographic location for the primary address of a business owner. The address may be entered as a favorite location. An icon may be associated with this favorite entry and may be displayed on a map. Display of the icon and/or favorite entry may be toggled by a user.

In another example, a favorite may relate to an action. For example, a favorite may be defined to search for households having a certain demographic within a geographic area with a recent storm event of a designated intensity. More particularly, provided without limitation, a favorite may be to find to search for single-family homes with a combined household income of over $150,000 within 50 mi of the primary business location of a user that also recently experienced a hail event with winds over 30 mph and hail over one quarter of an inch. The mapping component 700 may then return a map view showing only the filtered results of the favorite, advantageously providing a user the most useful information they requested while reducing the number of steps required to access such information. Of course, this example is provided for illustrative purposes only and is not intended to limit favorite aspects to only the specific example.

Favorites may be created by a user. For example, provided without limitation, a user may click on a button to save a favorite. A default name may be provided to the user for the favorite, which may be altered by the user if desired. If the user defines a favorite that is outside of an acceptable naming format, the user may be provided the opportunity to correct the non-compliant name. The favorite may be defined to include various information types, such as map locations, operations, filtered ranges, and other information types. Once saved, favorites may be made available to users to select via aspects of the dashboard component 600 or elsewhere throughout the system enabled by this disclosure. Favorites may be capable of editing, deletion, addition, duplication, copying, sharing, and otherwise made available as would be appreciated by a person of skill in the art after having the benefit of this disclosure.

The mapping component 700 may include features relating to a storm campaign aspect 718. For the purpose of this disclosure, storm campaigns are intended to include marketing campaigns relating to one or more storm events. A user may access the storm campaign aspect via a dashboard display, through social media, from a map, via a search tool, or elsewhere. Storm campaigns may be organized and sorted by various details, filtered ranges, information, data, and other details that would be apparent to those of skill in the art. For example, storm campaigns may be related to a storm event that occurred within a defined date range. And another example, storm campaigns may be related to storms that happened within an area included in a geographic boundary. In yet another example, storm campaigns may be related to weather events affecting households with the target demographic. Those having skill in the art will appreciate additional examples of storm campaigns after having the benefit of this disclosure, which is intended to be included within the scope and spirit of this disclosure.

In one embodiment, suggestions may be provided to a user regarding a storm campaign. For example, upon entering a city name, a storm campaign may be recommended to the user for storm events spanning the last 30 days covering the geographic boundary of such city. In another example, upon entering a target demographic parameter, such as homeowners having owned their home for more than 10 years, a storm campaign may be recommended with homes fitting the defined parameters that have also experienced a severe weather event within the past 30 days. Skilled artisans will appreciate additional examples of storm campaign filtering and recommendations and should not perceive the above examples to limit the types of storm campaigns or auto suggestions applicable to same.

A storm picker feature may be provided to facilitate creating storm campaigns or viewing storm information regarding a designated storm event. For example, a storm picker feature may allow a user to target sales agents to households affected by a severe storm having strong wind and hail that occurred on a designated date. Additional filters and parameters may be applied to storm events selected by the storm picker feature, such as homeowner status, insurance information, repair history, homeowner demographics, homeowner psychographics, and/or other information. Storm campaigns built using the storm picker feature may be saved as favorites.

The mapping component 700 may include a markup aspect 720, which may allow a user to add annotations, commentaries, and other drawn features to a map. A button may be provided via an interface to engage the markup aspect 720. Alternatively, features associated with the markup aspect 720 may be selected through a menu, list, toolbar, or otherwise. Markup provided via the markup aspect 720 may be included and saved as storm campaigns, favorites, and elsewhere.

In one embodiment, the markup aspect 720 may allow users to draw lines, shapes, polygons, letters, numbers, highlights, arrows, annotations, and other useful indications that may provide information or context to a user. For example, a user may engage a draw shape feature of the markup aspect 720. In this example, upon engaging this draw shape feature, a user may draw a polygon or other shape about a desired area on the map. When the user has completed drawing, the user may selectively disengage the draw feature. If the user made a mistake and drawing a shape or no longer wishes to view the shape, the user may undo the drawing operation, delete the shape, modify the shape, or otherwise alter the presentation of the drawn shape or other drawn feature. Keyboard shortcuts may be provided to facilitate engaging with the markup aspect 720. Drawn shapes may be saved as favorites. Additional market features will be appreciated by skilled artisans.

The mapping component 700 may include a swath aspect 722, wish may advantageously provide a visual representation of weather events as it relates to a map. For example, the swath aspect may provide visual information relating to hail swaths, wind swaths, rain swaths, and other weather related swaths as will be appreciated by a person of skill in the art. Various swaths may relate to different weather features of a weather event, and may be applied to a common map interface via layers. For example, a user may select to display a hail swath and hide a wind swath to have more clarity about hail events relating to a storm. The user may then decide that they want to know more information about wind associated with the weather event and enable the wind swath as an additional layer to be displayed with the hail swath layer. The user may selectively enable and disable layers relating to the information the user wishes to see or hide selectively.

The swath aspect 722 may create swaths in the context of the location of a user and/or defined geographic boundary. For example, a user's location may be determined by a computerized device on which a system enabled by this display disclosure may operate, such as a smartphone. For example, GPS or other triangulation coordinates may be determined to assist with locating a user's position on a map. Swaths may be enabled or disabled as it relates to the users location. The user may zoom in or out as desired to view the swath and the context of other features of the map. The map may be toggled to show street view, satellite view, terrain view, or other views as desired.

In one embodiment, swaths may be defined relative to a storm event indicated by data fetched by the fetch component 200. This data may be analyzed by the analytic component 400 and/or parsed by the parse component 300 to produce useful information relating to the weather event. For example, a swath me be received as data as a GeoJSON file, as will be appreciated by those of skill in the art. This GeoJSON data may undergo processing to add additional information and format the swath in a way that is easily manageable by various components of a system enabled by this disclosure and displayable via the mapping component 700. The swath aspect may include a swath GeoJSON processing operation. For example, when swath GeoJSON files are received, they may be processed to add additional information to each entry as well as formatting, for example by the analytic component 400, in a way that is easily manageable in an API/library used to assist with rendering the map.

For example, provided without limitation, the GeoJSON file may indicate a coordinates property as a 4-dimensional array. In this example, the innermost layer of the array may be a single point, [long, lat]. The 2nd innermost layer may be the collection of these points, creating a shape, in this case a polygon. The 3rd innermost layer may be the collection polygons that inherit the rest of that layer's properties. The outer layer of that 4D array may be a container of this collection. The base properties that may come with the GeoJSON file may be fill, fill-opacity, stroke, stroke-opacity, stroke-width, and title, which may be used for design aspects of a GeoJSON polygon. The title may be later used as an indicator in rendering to determine which color should be used to render the swath.

A ray casting algorithm may be used to determine whether or not a point is inside of a polygon. This may be done by taking a point outside of the polygon in question, drawing a line through the polygon from the point, and counting the number of times it intersects with the shape, for example, using the point slope formula and defining the y-intercept. If the number of times the line intersects with the polygon is even, it may be determined to be outside of the polygon. If the number of times the line intersects with the polygon is odd, then it may be defined to be inside of the polygon. This ray casting technique may find homes inside of hail swaths, service demand areas (SDA) effected by hail swaths, and more.

A right-hand rule may be used to determine information regarding the polygon. For example, the right-hand rule states that to denote a hole inside of a polygon in a GeoJSON, the hole may be listed in the same collection as the polygon in which the hole resides and after the external ring is listed, but should be listed clockwise, whereas exterior rings are counterclockwise. A shoelace algorithm can assist in making this determination.

An example will be provided regarding the way that holes, within a hole, within another hole may be handled, without limitation. In this example, the model may consider a 0.5" hail polygon, a 1" hail polygon inside of the 0.5" polygon, and a 1.5" hail polygon inside of the 1" hail polygon. The example may start by listing the 0.5" polygon counterclockwise, and then the 1" polygon clockwise to indicate that there is a hole. That may complete the 0.5" polygon listing, making the 1.5" moot because of the next step to be performed. Next, the example may create a new layer (or collection of polygons) that will take the 1" polygon as the exterior ring, and then the 1.5" polygon as the hole. This process may continue down to however many degrees it takes. In some embodiments wherein the GeoJSON files received does not follow the right-hand rule, the process of this example may advantageously format the restructure the GeoJSON files and put them into proper right-hand rule format.

A shoelace algorithm may determine the area of a polygon, for example, by cross multiplying coordinates of the vertices. However, the area of the polygon in this situation may be rendered unimportant, as using the shoelace algorithm may assist with determining whether the coordinates listed in the GeoJSON are listed in a clockwise order or counterclockwise order. This operation may assist with the important step of determining whether a shape in the GeoJSON is a hole or not, using the right-hand rule. Rather than finding the absolute value of the summations, this operation may determine whether it is clockwise (if the result is positive), or if it is counterclockwise (if the result is negative).

In one example, provided without limitation, a magnitude ceiling property may be provided to indicate the hail size of the polygon or the wind speed of the polygon, which may be denoted as a floating-point value. This value may be mapped based on the Title value of the polygon. For example, the titles for Hail V1 of the following: "Hail Possible", which refers to ≤1", "Severe Hail" which refers to ≤2", "Damaging Hail" which refers to ≤3", and "Extreme Hail" for >3". In the GeoJSON files, the titles may be changed to use the pattern "X Hail", where X is a floating-point value that indicates the max diameter of the hail size, i.e. "0.50 Hail". Likewise, the titles for wind may be "X mph" where X is a floating-point value that may indicate the max speed of the wind, i.e. "50.00 mph".

A Boolean property may be provided indicating whether the polygon is within the United States or not. This Boolean property may be used to determine whether to display this swath, in case there are reported events from Canada, Mexico, or in one of the bordering oceans. This may be determined by using a custom-made polygon that roughly borders the US (with a slight buffer) and seeing if the hail polygon is within the US polygon. The US polygon may be stored in a file which can be found in the weather-assets blob.

A number of households may also be represented within the polygon. This may be calculated by adding the number of households of an SDA household count value in the polygon. This number may exclude any polygons that reside within it. For example, if a 1" hail polygon with 10 households resided within a 0.5" hail polygon, the number of households in the 0.5" polygon could be exclusive of the 10 households in the 1" polygon.

A reverse geocoding operation may be provided. Information such as the effected locations inside of the swath may be added during this process. A reverse geocoding process may be used that utilizes a database for location data. Additions of the transformed swath that utilize this reverse geocoding process may include the State, City, and Zipcode properties, and the EffectedAreas property, which can be an array of LocationData objects, which may include ZipCode, Latitude, Longitude, City, State, Country, Magnitude (of the storm), and region. This may be utilized to find the Properties.City, Properties.State, and Properties.ZipCode values.

A service demand area (SDA) calculation may be performed. To calculate which SDAs may be affected on each polygon, such as by using a GeoJSON file containing SDAs. This file may contain coordinates and other parameters (Id, Name, State, Region, Zip, CenterLat, CenterLong) belonging to each SDA. The SDAs may be calculated by running the ray-casting formula on vertices of the SDA polygon on the current polygon, and vertices of the current polygon on the SDA polygon. This operation may be performed both ways to avoid an edge case where an SDA overlaps a polygon, but the polygon has no vertices in the SDA polygon. The hail polygon may intersect with the SDA polygon, so if the ray casting algorithm were ran using the vertex of the hail polygon on the SDA polygon, it would register that the hail polygon effects the SDA.

Household counts may be calculated on multiple levels. The most granular level may include currently storing the calculated household counts for each SDA per polygon. As mentioned above, each polygon may have an SDA property which contains an array of SDAs, and each entry in that array may be data for an SDA that the polygon contains, which may also include household count. Note that this value may be the number of households within both the polygon and the SDA. Household counts may also be stored on the polygon level. This may be calculated by taking the sum of the household counts in the SDAs of the polygon. These values may advantageously facilitate using this data to get the number of homes effected per polygon, as well as the number of homes per SDA within that polygon.

Figure 8:
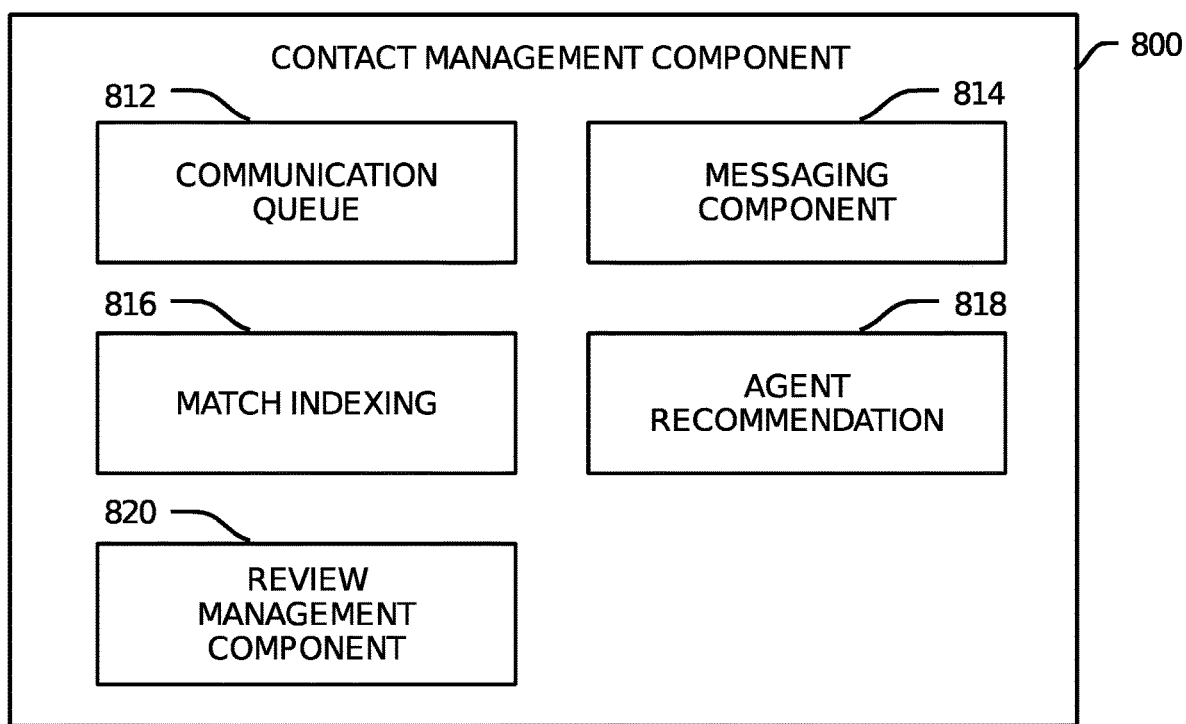
FIG. 8 is a block diagram view of an illustrative contact management component, according to an embodiment of this disclosure.

The contact management component will now be discussed in greater detail. FIGS. 1 and 8 highlight examples of the contact management component, which may also be shown in other figures. The contact management component 800 may include a communication queue aspect 812. The communication queue aspect may include a contact queue list, buckets associated with the communication queue, search features, filtering features, sorting features, and/or other features. Regarding the contact queue list, users may be provided an option to view a list of communication activities. For example, a user may view details relating to the prospective customer. Such details may include a prospective customer's name, the type of inquiry the prospective customer is likely to request from the user, appointment information, and information relating to correspondence with the prospective customer. Appointment information may include the setting of an appointment, a name given to the appointment, and an indication as to whether an appointment is needed or has been set.

The contact cue list may additionally include information regarding the time since the prospective customer last replied to correspondence from a sales agent. This information may be filtered or organized by time, type, or otherwise. For example, an indication may be given that a prospective customer has not been contacted within the last three days. The sales agent may be instructed to reach out to the prospective customer and continue to engage with them in the hopes of converting the prospective customer into an actual customer. A user may additionally view an activity, for example by clicking on an activity in the contact cue list to activate a dialog pane for that activity, mark messages as read and/or unread, and otherwise see visual indications of activity status relating to the same.

Conversations may be separated into categorized buckets. For example, conversations may be categorized into an unsigned bucket indicative of conversation not currently assigned to a sales agent or other user, which may be visible to all users in a company and may have unread messages within the bucket. Additionally, conversations may be categorized into a "my messages" bucket in which conversations may be assigned to an active user or sales agent. These messages may be set as visible only to the assigned user. Conversations may additionally be separated into a closed bucket indicating that the conversations have been completed and/or are closed. Conversations in the closed bucket may be shareable with all users in a company. Conversations may be sorted into an "assigned by me" bucket, indicative that such conversations are assigned by the active user. These conversations may be set to be visible only to the active user. Skilled artisans will appreciate that the above examples are not intended to limit other embodiments of separation of conversations into buckets, which are to be included within the scope and spirit of this disclosure.

A search feature may be provided to search through the conversations of a user. Those having skill in the art will appreciate various parameters for which a search may be applied, which may include name, phone, address, city, zip, appointment name, product type, and other parameters that would be appreciated after having them benefit of this disclosure. Users may be able to toggle which buckets to include in a search.

Users may be able to filter their conversations. Filtering options will be appreciated by those of skill in the art, but may include without limitation, view all, unread only, appointment cancellation, reschedule, new project, project status, billing claim, warranty, appointments set, unknown, flagged, assigned, activity type such as AI chatbot or float quote, and other options. Filtering options may be selected using interface features such as check boxes, radio buttons, selectors, drop-down menus, and other selection interface features that would be appreciated by those of skill in the art. Filtering may be selectively applied only to designated buckets.

Users may additionally sort conversations for example by parameters such as date, name, inquiry type, appointment name, and other parameters that would be appreciated by those of skill in the art. Some options may be provided to sort conversations by ascending or descending order, by selection, or by bucket. In some embodiments, and address book feature may be provided to list contacts and prospective customers which may be ordered by name, email, phone, address, and other parameters.

The contact management component 800 may include messaging component 814. The messaging component may be provided to assist with communication between a business and a current and/or potential customer. The messaging component may advantageously assist with the business assessing and need of the potential customer. The messaging component may provide communication via multiple channels of communication such as, without limitation, text messaging, email, physical mailings, telephone, video calls, video conferencing, file sharing, electronic document signing, online interfaces, chatbots, and/or other communication media that would be apparent to a person of skill in the art after having the benefit of this disclosure.

A messaging component enabled by this disclosure advantageously reduces the friction between a potential customer and/or an existing customer that desires to communicate with a business. The messaging component may increase the simplicity of communicating with a business by providing numerous options of communication to the prospective and/or existing customer to engage with the business. Features of the messaging component may be provided through the dashboard component 600 and/or other communication networks.

Interaction with the messaging component may be accessed by the prospective customer and/or current customer via a computerized device featuring a display, such as a computer or smartphone. The messaging component may be included and/or incorporated into the dashboard component 600. Aspects of the messaging component may be displayed to the user via an internet browser, dedicated application, integration into another application, and/or other interface feature associated with the computerized device that would be appreciated by those of skill in the art.

The messaging component 814 may advantageously facilitate communication with prospective customers, existing customers, and others. The messaging component 814 may work operatively with other components of the system, which may be included in the components discussed above or later throughout this disclosure. The messaging component 814 may include a simple interactive interface to facilitate communication with prospective customers via text message, phone call, email, video messaging, zoom messaging, chat, SMS, forms, and otherwise as will be appreciated by those of skill in the art after having the benefit of this disclosure.

Communications provided through a system enabled by this disclosure may be tracked for use, the usage of which being accumulated for invoicing and/or billing to users. In another embodiment, a baseline number of messaging features may be provided with a subscription wherein an overage is calculated and charged for usage beyond that included in a subscription. For example, phone call connections may be provided in the messaging component including a base number of calls. If a user exceeds the base number of calls, they may be charged at a rate of, for example, $5 per connection. Those of skill in the art will appreciate that the rate is given for illustrative purposes only and not intended to limit the structure of the messaging component or its monetization in any way.

Updates may be provided via the messaging component 814, for example via a communications portal. An indication may be provided to a user if a message attempt fails. Prior messages may be listed for user review. Text messaging may be conducted via a text box through the dashboard interface, via an application installable on a computerized device, via an internet connection, and/or otherwise. Default messaging and/or canned responses may be provided to facilitate quick and consistent communication with prospective and existing customers. Additionally, default messaging may be defined on a CRM schedule that, once engagement by the prospective customer is detected, is transferred to a live sales agent or other user. This transfer may be made by phone, text, SMS, MMS, chat, video, and/or other communication form.

In one embodiment, chatbots may be provided to facilitate receipt and answering of common questions. The chatbot may be facilitated by machine learning, which may improve the relevance of responses given to a received inquiry by a prospective customer and/or existing customer. For example, a prospective customer may send a message to a user requesting pricing for a job. The chatbot may intercept the message and prepare a response that is relevant and informative to the prospective customer. The prospective customer then may respond to the chatbot, whether or not the prospective customer is aware that they are speaking with a chatbot. In some cases, the prospective customer response may include a question that is beyond the ability of the chatbot to respond or better suited for a live representative. The message may then be forwarded to the live representative for follow up and continued engagement.

In one embodiment, communications conducted through the messaging component may be recorded. Such recordings may be stored for record keeping, analytics, future business development, and other applications that will be appreciated by a person of skill in the art after having the benefit of this disclosure. Consent may be requested from the participants of the communication prior to recording, analytics applied to the recordings, or other operations for which consent may be required or desirable.

The contact management component 800 may include a match indexing aspect 816. A match index may be generated and associated with the prospective customer providing an indication as to the likelihood of conversion of the prospective customer into a current customer. The system enabled by this disclosure may consider information about the prospective customer to assist with generation of the match index including, without limitation, information about a prospective customer's home or property, demographics, psychographics, personality profile, purchase history, credit card usage history, advertising metrics, and other information that may assist with determining the likelihood of conversion relating to the prospective customer.

The match index may be compared with profiles of sales agents to assist with matching an agent likely to have a high efficacy in converting the prospective customer into a current client, demonstrating a high likelihood of relatability with the prospective customer. Agents showing a high agreeability and/or likelihood of relatability with a prospective customer may be favored for engaging with the prospective customer. For example, an agent having a high likelihood of relatability with a customer may be more likely to have a more engaging conversation with the prospective customer due in part to increased agreeability, connect with the prospective customer, and convert the prospective customer into an actual customer.

An agent having high agreeability may additionally possess a high likelihood of relatability, allowing the agent to display qualities to the prospective customer that demonstrates the agent understands the prospective customer, understands the needs of the prospective customer, and otherwise shows aspects of empathy for the prospective customer. The system enabled by this disclosure advantageously allows an agent to interact with the prospective customer in a manner that is most conducive and productive to solving the prospective customers needs and engaging in business with the prospective customer to provide those solutions.

The match indexing aspect 816 advantageously considers various points of data and information to increase the likelihood of a prospective customer engaging with a user and becoming an existing customer. The match indexing aspect may leverage predictive analytics, which may perform operations using machine learning, to detect patterns between various sources of information and data that may be indicative of an increased likelihood of converting a prospective customer into an actual customer given certain conditions. For example, a match indexing aspect 816 may consider a weather event that occurred in the geographic area of a prospective customer, the demographics of the prospective customer, psychographics of a prospective customer, the social traits of a prospective customer, and the compatibility of a selectable sales agent to develop a rapport with the prospective customer such as to encourage the prospective customer, increase as likelihood of influenceability with the prospective customer, and to convert into an active customer and engage in commerce with the user.

The match indexing aspect 816 may consider parsed information, which may be gathered from data that is fetched by the fetch component 200, and derived information. The match indexing aspect may additionally work cooperatively with the insight component 500 to develop predictive information that may provide insight into the behavioral and social qualities of a prospective customer so that a compatible sales approach may be developed. The match indexing aspect and predictive analytics may consider factors such as home demographics, psychographics, home details, lead source, information from title companies, public records, third party data providers, homeowner demographics, psychographics, personality profile, and other factors relating to a prospective customer. Additional Data may be used to derive useful information about a prospective customer such as credit card purchase history, advertising profile, credit profile, publicly available information, social media shared information, purchasable customer data, and other information indicative of the behavioral and social patterns of a prospective customer. This data and information may be provided to a machine learning routine to provide insight into predictive information that may assist developing the approach to engage with the prospective customer.

During operation of the match indexing aspect, information may be weighed and analyzed by one or more of the components of a system enabled by this disclosure, for example the parse component 300, the analytic component 400, the insight component 500, and/or other components, features, and aspects provided throughout this disclosure. Machine learning may assist with determining correlations, which may contribute to building a match index that may be assigned with a prospective customer. The match index may be a generalized metric indicative of the likelihood of a prospective customer engaging in commerce with the user converting into an existing customer. The lease score may be altered to indicate a level of compatibility between a prospective customer and a proposed sales agent.

The match index may additionally include an indication as to the value of a lead. For example, the match index may include an indication as to the level of work that may be requested by a prospective customer, the value of the work that will be requested, and the likelihood of making a return on the investment of pursuing the prospective customer to engage in a sales relationship. Factors that may contribute to determining a match index may additionally include information regarding a prospective customer's home, land, age, home construction type, neighborhood, trends, mortgage status, demographics, psychographics, family information, income, job information, affiliations, personality profile, social media history, internet activity history, credit card purchases, and other factors.

The contact management component 800 may include an agent recommendation aspect 818, which may assist with determining which sales agent may have the highest probability of engagement with a prospective customer based at least in part on agreeability and a likelihood of relatability. For example, the agent recommendation aspect may consider the match index associated with a prospective customer, information relating to the prospective customer, and the profile of a sales agent and/or other user to determine the likelihood of there being a match such that rapport may be built, trust may be established, and conversion into an existing customer may be accomplished.

The agent recommendation aspect may facilitate matching sales to the prospective customer based on whether the sales agent fits the prospective customer profile of the prospective customer. The agent recommendation aspect advantageously improves the likelihood of relatability between the sales agent and the prospective customer, which may lead to an increased likelihood of the prospective customer liking the sales agent, and thus increasing the likelihood of a sale. The agent recommendation aspect may advantageously use machine learning to assist with the correlation between prospective customer profiles, sales agent profiles, and the likelihood of such being compatible.

Users and subscribers may be given access to information provided by the agent recommendation aspect, match indexing aspect, and other related aspects via a predictive portal. Users may purchase predictive portal information for a contact through a subscription, ad hoc, a la carte, or otherwise as will be appreciated by those of skill in the art. Purchases by a user, such as a company, may be made available to sales agents within the users company. Sales agents and others associated with the user may see the match index, the results of the predictive analytics, and a match index indicating the likelihood of the sales agent being compatible and building rapport, for example by having a high degree of influenceability with the prospective customer. Users may also be provided demographic information relating to the prospective customer, property information, street view of the home of the prospective customer, severe weather information relating to the household and/or property of the prospective customer, personality data for the prospective customer, contact details for the prospective customer, and other information relating to the prospective customer or the likelihood of converting the prospective customer into an actual customer.

The predictive portal may additionally facilitate customer engagement by the sales agent. Sales agents and other users may be able to view the prospective customers appointments, requests for information, requested date and time for appointments, files shared by the prospective customer, photos provided by the prospective customer, communication history, and other information relating to the prospective customer and/or the likelihood of converting the prospective customer into an actual customer. Additionally, sales agents qualified, for example by having a match index above an acceptable threshold, may bid for the prospective customer. In some embodiments, such bidding does not need to involve financial contribution but may merely stake a claim to pursue the prospective customer for a commercial transaction. Prospective customers may additionally be placed in a queue for sales agents to browse, select, engage, and attempt to convert into an existing customer.

The contact management component 800 may include a review management component 822. The contact management component may advantageously assist with advertising efforts. For example, the review management component 822 may apply some of the information determined about characteristics for prospective customers to define characteristics of an advertising campaign. Additionally, the review management component 822 may assist with identifying advertising platforms with a high probability of reaching the desired type of potential customers. The review management component 822 may facilitate continued business opportunities through referral of current and past customers and increasing visibility of a business to potential customers affiliated or otherwise having a connection to current and past customers.

In one example, provided without the intent to limit the operation of the review management component 822, a profile associated with a prospective customer may indicate that the prospective customer enjoys participating in social network activity. This prospective customer may be best reached and influenced by advertising on a social media platform through which the prospective customer spends a significant amount of time. The advertising campaign may then prioritize displaying advertising to the prospective customer on the preferred platform.

Additionally in this example, in a scenario where a prospective customer has been converted into an actual current or past customer, connections affiliated with the customer that likely experienced the same events causing the customer to engage with the business may also be highlighted for being pursued as potential customers. Through this approach, the new potential customer may see advertisements for the business engaging in a platform enabled by this disclosure for services similar to those provided by the business for a neighbor, friend, family member, or other person with a connection to the new prospective customer.

Once the new prospective customer is provided the advertisements for the business, the prospective customer may recognize the business's name and have familiarity with the business services relating to the needs of that prospective customer. The new prospective customer may organically engage in conversation with their connections about their needs for business services, encouraging those connections to discuss their experiences with the business engaging in the advertising campaign and give their feedback relating to same. Advantageously, a system enabled by this disclosure facilitates the process of assisting a business to become known to a potential customer and assisting with that potential customer validating the business with their connections and the experiences those connections have had with the business.

In one embodiment, the review management component 820 may assist with monitoring and managing online representation through review sites such as Facebook, Google, Yelp, Yahoo, Bing, Better Business Bureau, Home Advisor, Angie's list, Consumer Reports, Thumbtack, and/or other review platforms that will be appreciated by a person of skill in the art after having the benefit of this disclosure. The review management component may aggregate reviews online provided by customers regarding a user's service. The review source may be accompanied with a field to paste an internet address relating to the review source. In one embodiment, a URL short code may be generated to facilitate sharing of the internet address. A feature may also be provided such that a user and/or sales agent may engage with the prospective customer at the review website or provider to provide a thank you for a positive review, provide context for a negative review, or otherwise continue engagement with the customer after the service has been provided.

The review management component 820 may additionally assist with requesting reviews from satisfied customers. The review management component 820 may include example correspondence language to send to the customer requesting a review on one or more review sites. The review management component 820 may work in cooperation with other aspects of the customer management component, messaging component, and/or other components and aspects of a system enabled by this disclosure. The feature may additionally be provided to screen customers for perceived level of satisfaction, prioritizing customers most likely to give a positive review to receive a review invite. Review requests may be added, edited, deleted, and otherwise managed by a user.

In operation, a method may be provided for assisting sales by leveraging predictive analytics consistent with the disclosure provided above. Those of skill in the art will appreciate that these methods are provided to illustrate an embodiment of the disclosure and should not be viewed as limiting the disclosure to only those methods or aspects. Skilled artisans will appreciate additional methods within the scope and spirit of the disclosure for performing the operations provided by the examples below after having the benefit of this disclosure. Such additional methods are intended to be included by this disclosure.

Figure 9:
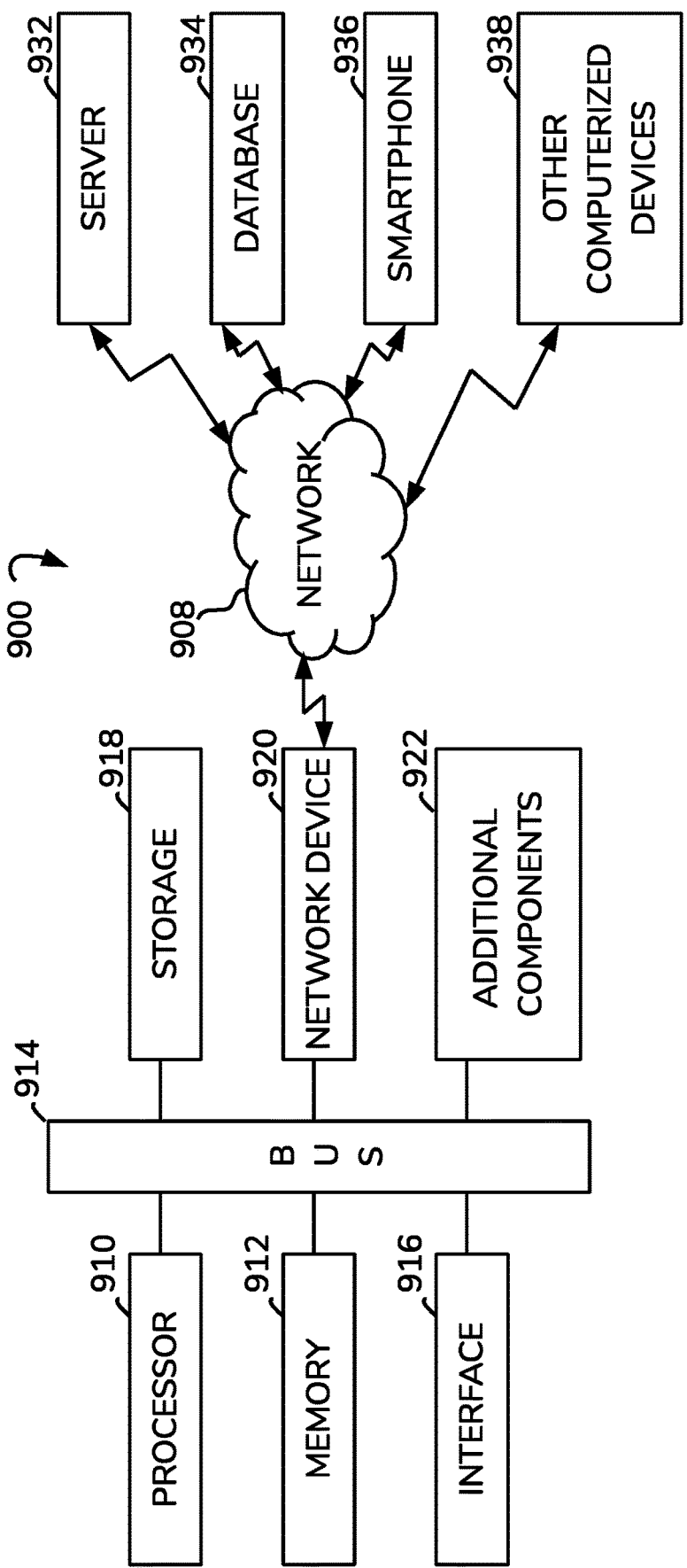
FIG. 9 is a block diagram view of an illustrative computerized device, according to an embodiment of this disclosure.

Referring now to FIG. 9, an illustrative computerized device will be discussed, without limitation. Various aspects and functions described in accord with the present disclosure may be implemented as hardware or software on one or more illustrative computerized devices 900 or other computerized devices. There are many examples of illustrative computerized devices 900 currently in use that may be suitable for implementing various aspects of the present disclosure. Some examples include, among others, network appliances, personal computers, workstations, mainframes, networked clients, servers, media servers, application servers, database servers and web servers. Other examples of illustrative computerized devices 900 may include mobile computing devices, cellular phones, smartphones, tablets, video game devices, personal digital assistants, network equipment, devices involved in commerce such as point of sale equipment and systems, such as handheld scanners, magnetic stripe readers, bar code scanners and their associated illustrative computerized device 900, among others. Additionally, aspects in accord with the present disclosure may be located on a single illustrative computerized device 900 or may be distributed among one or more illustrative computerized devices 900 connected to one or more communication networks.

For example, various aspects and functions may be distributed among one or more illustrative computerized devices 900 configured to provide a service to one or more client computers, or to perform an overall task as part of a distributed system. Additionally, aspects may be performed on a client-server or multi-tier system that includes components distributed among one or more server systems that perform various functions. Thus, the disclosure is not limited to executing on any particular system or group of systems. Further, aspects may be implemented in software, hardware or firmware, or any combination thereof. Thus, aspects in accord with the present disclosure may be implemented within methods, acts, systems, system elements and components using a variety of hardware and software configurations, and the disclosure is not limited to any particular distributed architecture, network, or communication protocol.

FIG. 9 shows a block diagram of an illustrative computerized device 900, in which various aspects and functions in accord with the present disclosure may be practiced. The illustrative computerized device 900 may include one or more illustrative computerized devices 900. The illustrative computerized devices 900 included by the illustrative computerized device may be interconnected by, and may exchange data through, a communication network 908. Data may be communicated via the illustrative computerized device using a wireless and/or wired network connection.

Network 908 may include any communication network through which illustrative computerized devices 900 may exchange data. To exchange data via network 908, systems and/or components of the illustrative computerized device 900 and the network 908 may use various methods, protocols and standards including, among others, Ethernet, Wi-Fi, Bluetooth, TCP/IP, UDP, HTTP, FTP, SNMP, SMS, MMS, SS7, JSON, XML, REST, SOAP, RMI, DCOM, and/or Web Services, without limitation. To ensure data transfer is secure, the systems and/or modules of the illustrative computerized device 900 may transmit data via the network 908 using a variety of security measures including TSL, SSL, or VPN, among other security techniques. The illustrative computerized device 900 may include any number of illustrative computerized devices 900 and/or components, which may be networked using virtually any medium and communication protocol or combination of protocols.

Various aspects and functions in accord with the present disclosure may be implemented as specialized hardware or software executing in one or more illustrative computerized devices 900, including an illustrative computerized device 900 shown in FIG. 9. As depicted, the illustrative computerized device 900 may include a processor 910, memory 912, a bus 914 or other internal communication system, an input/output (I/O) interface 916, a storage system 918, and/or a network communication device 920. Additional devices 922 may be selectively connected to the computerized device via the bus 914. Processor 910, which may include one or more microprocessors or other types of controllers, can perform a series of instructions that result in manipulated data. Processor 910 may be a commercially available processor such as an ARM, x86, Intel Core, Intel Pentium, Motorola PowerPC, SGI MIPS, Sun UltraSPARC, or Hewlett-Packard PA-RISC processor, but may be any type of processor or controller as many other processors and controllers are available. As shown, processor 910 may be connected to other system elements, including a memory 912, by bus 914.

The illustrative computerized device 900 may also include a network communication device 920. The network communication device 920 may receive data from other components of the computerized device to be communicated with servers 932, databases 934, smart phones 936, and/or other computerized devices 938 via a network 908. The communication of data may optionally be performed wirelessly. More specifically, without limitation, the network communication device 920 may communicate and relay information from one or more components of the illustrative computerized device 900, or other devices and/or components connected to the computerized device 900, to additional connected devices 932, 934, 936, and/or 938. Connected devices are intended to include, without limitation, data servers, additional computerized devices, mobile computing devices, smart phones, tablet computers, and other electronic devices that may communicate digitally with another device. In one example, the illustrative computerized device 900 may be used as a server to analyze and communicate data between connected devices.

The illustrative computerized device 900 may communicate with one or more connected devices via a communications network 908. The computerized device 900 may communicate over the network 908 by using its network communication device 920. More specifically, the network communication device 920 of the computerized device 900 may communicate with the network communication devices or network controllers of the connected devices. The network 908 may be, for example, the internet. As another example, the network 908 may be a WLAN. However, skilled artisans will appreciate additional networks to be included within the scope of this disclosure, such as intranets, local area networks, wide area networks, peer-to-peer networks, and various other network formats. Additionally, the illustrative computerized device 900 and/or connected devices 932, 934, 936, and/or 938 may communicate over the network 908 via a wired, wireless, or other connection, without limitation.

Memory 912 may be used for storing programs and/or data during operation of the illustrative computerized device 900. Thus, memory 912 may be a relatively high performance, volatile, random access memory such as a dynamic random-access memory (DRAM) or static memory (SRAM). However, memory 912 may include any device for storing data, such as a disk drive or other non-volatile storage device. Various embodiments in accord with the present disclosure can organize memory 912 into particularized and, in some cases, unique structures to perform the aspects and functions of this disclosure.

Components of illustrative computerized device 900 may be coupled by an interconnection element such as bus 914. Bus 914 may include one or more physical busses (for example, busses between components that are integrated within a same machine), but may include any communication coupling between system elements including specialized or standard computing bus technologies such as USB, Thunderbolt, SATA, FireWire, IDE, SCSI, PCI and InfiniBand. Thus, bus 914 may enable communications (for example, data and instructions) to be exchanged between system components of the illustrative computerized device 900.

The illustrative computerized device 900 also may include one or more interface devices 916 such as input devices, output devices and combination input/output devices. Interface devices 916 may receive input or provide output. More particularly, output devices may render information for external presentation. Input devices may accept information from external sources. Examples of interface devices include, among others, keyboards, bar code scanners, mouse devices, trackballs, magnetic strip readers, microphones, touch screens, printing devices, display screens, speakers, network interface cards, etc. The interface devices 916 allow the illustrative computerized device 900 to exchange information and communicate with external entities, such as users and other systems.

Storage system 918 may include a computer readable and writeable nonvolatile storage medium in which instructions can be stored that define a program to be executed by the processor. Storage system 918 also may include information that is recorded, on or in, the medium, and this information may be processed by the program. More specifically, the information may be stored in one or more data structures specifically configured to conserve storage space or increase data exchange performance. The instructions may be persistently stored as encoded bits or signals, and the instructions may cause a processor to perform any of the functions described by the encoded bits or signals. The medium may, for example, be optical disk, magnetic disk, or flash memory, among others. In operation, processor 910 or some other controller may cause data to be read from the nonvolatile recording medium into another memory, such as the memory 912, that allows for faster access to the information by the processor than does the storage medium included in the storage system 918. The memory may be located in storage system 918 or in memory 912. Processor 910 may manipulate the data within memory 912, and then copy the data to the medium associated with the storage system 918 after processing is completed. A variety of components may manage data movement between the medium and integrated circuit memory element and does not limit the disclosure. Further, the disclosure is not limited to a particular memory system or storage system.

Although the above described illustrative computerized device is shown by way of example as one type of illustrative computerized device upon which various aspects and functions in accord with the present disclosure may be practiced, aspects of the disclosure are not limited to being implemented on the illustrative computerized device 900 as shown in FIG. 9. Various aspects and functions in accord with the present disclosure may be practiced on one or more computers having components other than that shown in FIG. 9. For instance, the illustrative computerized device 900 may include specially programmed, special-purpose hardware, such as for example, an application-specific integrated circuit (ASIC) tailored to perform a particular operation disclosed in this example. While another embodiment may perform essentially the same function using several general-purpose computing devices running Windows, Linux, Unix, Android, iOS, MAC OS X, or other operating systems on the aforementioned processors and/or specialized computing devices running proprietary hardware and operating systems.

The illustrative computerized device 900 may include an operating system that manages at least a portion of the hardware elements included in illustrative computerized device 900. A processor or controller, such as processor 910, may execute an operating system which may be, among others, an operating system, one of the above mentioned operating systems, one of many Linux-based operating system distributions, a UNIX operating system, or another operating system that would be apparent to skilled artisans. Many other operating systems may be used, and embodiments are not limited to any particular operating system.

The processor and operating system may work together to define a computing platform for which application programs in high-level programming languages may be written. These component applications may be executable, intermediate (for example, C #or JAVA bytecode) or interpreted code which communicate over a communication network (for example, the Internet) using a communication protocol (for example, TCP/IP). Similarly, aspects in accord with the present disclosure may be implemented using an object-oriented programming language, such as JAVA, C, C++, C #, Python, PHP, Visual Basic .NET, JavaScript, Perl, Ruby, Delphi/Object Pascal, Visual Basic, Objective-C, Swift, MATLAB, PL/SQL, OpenEdge ABL, R, Fortran or other languages that would be apparent to skilled artisans. Other object-oriented programming languages may also be used. Alternatively, assembly, procedural, scripting, or logical programming languages may be used.

Additionally, various aspects and functions in accord with the present disclosure may be implemented in a non-programmed environment (for example, documents created in HTML5, HTML, XML, CSS, JavaScript, or other format that, when viewed in a window of a browser program, render aspects of a graphical-user interface or perform other functions). Further, various embodiments in accord with the present disclosure may be implemented as programmed or non-programmed elements, or any combination thereof. For example, a web page may be implemented using HTML while a data object called from within the web page may be written in C++. Thus, the disclosure is not limited to a specific programming language and any suitable programming language could also be used.

An illustrative computerized device included within an embodiment may perform functions outside the scope of the disclosure. For instance, aspects of the system may be implemented using an existing commercial product, such as, for example, Database Management Systems such as a SQL Server available from Microsoft of Redmond, Wash., Oracle Database or MySQL from Oracle of Redwood City, Calif., or integration software such as WebSphere middleware from IBM of Armonk, N.Y.

In an additional embodiment, a campaign component may be provided, as will be discussed in greater detail below. The campaign component 850 may assist with creation, management, data reporting, automation, and distribution of advertising and/or marketing campaign materials. The campaign component 850 may facilitate the creation and execution of campaigns using a manual and/or automated structure. In some embodiments, a hybrid campaign model may be provided in which an advertising template is customizable manually and/or automatically using data and other information included by a system such as one enabled by this disclosure.

The campaign component 850 may operate with various other components provided by a system enabled by this disclosure. For example, the campaign component 850 may operate in assistance with the fetch component, the parse component, analytic component, and/or the insight component to retrieve and apply information generated by such components consistent with the examples given above. The campaign component 850 may additionally operate with a mapping component, such as described above, to facilitate selection of an area in which to focus a campaign. The campaign component 850 may advantageously derive potential households and other potential customers located within the selected area to which marketing efforts may be directed.

Additional parameters may be provided to further refine the households identified within the selected area to which an advertising campaign may desirably be directed. Those of skill in the art will appreciate that the additional parameters may describe a feature or characteristic of a desired household type, which may relate to roof, siding, house type, property, flood plain location, basement type, construction materials, floors, foundation, inspection results, and other parameters that would be apparent after having the benefit of this disclosure. In one example, provided with the intent to clarify one possible parameter and given without limitation, a user may select an area in which a campaign for selling household vinyl siding installation services should be operated with additional parameters relating to whether a house is brick, stucco, concrete, painted wood, and/or has existing vinyl siding. The houses selected for the campaign may return houses that are sided using vinyl and/or any other selected siding type, advantageously focusing the resources for the advertising campaign on the prospective customers with the highest likelihood of conversion for that illustrative advertising campaign. Those of skill in the art will appreciate that refinements to households that may be identified for inclusion in an advertising campaign defined by the campaign component 850 may be based on other and/or additional features beyond merely house siding types or the other illustrative parameters stated above. Other advertising campaigns may be refined using additional parameters, without limitation.

In one embodiment, the dashboard component may be operable with the campaign component 850 to facilitate defining campaigns, monitoring, managing campaign operation, reporting, reviewing campaign performance, defining automation routines, and/or other interactions that may facilitate the creation and execution of an advertising, sales, and/or marketing campaign. For example, the campaign component 850 may advantageously receive operational instructions given through the dashboard component and report results and/or other campaign statuses via the dashboard component, without limitation.

An example of creating a manual campaign will now be discussed, without limitation. In this example, the operation may generally include defining account settings, defining a campaign area, accessing information regarding homes in the campaign area, defining a campaign duration and budget, and other operational steps that would assist in creation and execution of an advertising, marketing, and/or sales campaign. In one example, an initial step may include defining account settings, such as between manual and automated operation. A default option may be provided, for example automated operation, without limitation. However, those of skill in the art will appreciate that even where a default campaign operation is suggested, the actual campaign operation applied may be toggled and/or otherwise altered by a user.

To define a manual campaign, a user may select that the campaign will be manual during setup. Manual campaigns may be advantageous for users in some circumstances, for example, when approaching or exceeding an ad account limit, encountering a programming error or bug, access to a data source and/or other dependent connection is lost, precision is required in defining the marketing audience, and other situations that will be appreciated by those of skill in the art after having the benefit of this disclosure.

With the account settings being defined, the campaign made further be specified by drawing a boundary around a geographic area for which the campaign will be applied. For example, a user may draw a polygon on a map, such as provided via the mapping component. The polygon or other boundary may encapsulate swaths in which marketing efforts may be targeted. Additional criteria can be defined by the user relating to the types of households and/or prospective customers to include in the campaign, for example, house structural characteristics, homeowner demographics, homeowner psychographics, purchase history, publicly provided information, privately sourced information, and/or other criteria consistent with the scope and spirit of this disclosure.

After a desired area is identified, the user may engage an option to indicate that they have completed selecting a campaign area by interacting with the interface, for example, clicking a "done" button. The operation may then retrieve home counts within the defined boundaries, which may be compliant with the additional criteria if specified. For example, a snapshot may be taken of the defined geographic area, such as may be included by a polygon drawn in the step above. The total number of homes within the bounded area may be calculated. For lengthy calculations, a progress bar may be provided to a user to confirm that the operation is still processing but not yet complete.

Once the calculation of the total number of homes in the defined geographic area is complete, the results may be provided to a user, for example via a visual interface. A user may also be provided an interface feature to begin the campaign, for example, a "start campaign" button.

The user may then define a campaign duration and budget. In this step, base advertising information may be provided to define operational parameters of the campaign. Illustrative information may include a campaign name, a start date, and end date, a duration, a lifetime budget, a limited budget, and/or other information that may be used to setup the campaign. Once the campaign is defined, the user may submit the campaign for commencement.

Upon submission of the campaign, the system enabled by this disclosure may advantageously create a marketing audience, such as maybe provided via third-party marketing platform, for example, a social networking platform. In one example, provided without limitation, submitting a campaign may initiate a system enabled by this disclosure to create a Facebook audience. For example, the campaign component may call a cloud computing function to create an audience list and validate successful creation of that list. The campaign component may use an advertising template to facilitate creating the marketing audience. Information may then be sent to a team associated with the user that the campaign was created.

Once a manual campaign is created, information and data may be sourced from other components of a system enabled by this disclosure to facilitate execution of the campaign. Marketing correspondence may then be directed towards prospective customers using the generated content from the campaign component, which may be based at least partially on advertising templates and data provided by the various components of a system enabled by this disclosure. The campaign may then be executed within the defined parameters to distribute sales and marketing materials to the identified prospective customers.

In an additional example, an automated campaign may be defined via the campaign component 850. In this example, the operation may generally include defining an account setting, defining a campaign area, accessing information regarding homes in the campaign area, and/or monitoring campaign progress, without limitation. Automated campaign creation and management may additionally include providing access to a third-party marketing platform, providing permissions to manage the campaign to a designated agent relating to the user, reviewing and accepting the third-party marketing platform's terms and conditions, defining a page on the third-party marketing platform for which the campaign may be located, providing billing information for the campaign, defining a campaign duration and budget, designing the aesthetic aspects of the campaign, defining notification settings, finalizing creation of the campaign, and commencing the campaign. These steps will be discussed in greater detail below.

With the account settings being defined, the campaign made further be specified by drawing a boundary around a geographic area for which the campaign will be applied. For example, a user may draw a polygon on a map, such as provided via the mapping component. The polygon or other boundary may encapsulate swaths in which marketing efforts may be targeted. Additional criteria can be defined by the user relating to the types of households and/or prospective customers to include in the campaign, for example, house structural characteristics, homeowner demographics, homeowner psychographics, purchase history, publicly provided information, privately sourced information, and/or other criteria consistent with the scope and spirit of this disclosure.

After a desired area is identified, the user may engage an option to indicate that they have completed selecting a campaign area by interacting with the interface, for example, clicking a "done" button. The operation may then retrieve home counts within the defined boundaries, which may be compliant with the additional criteria if specified. For example, a snapshot may be taken of the defined geographic area, such as may be included by a polygon drawn in the step above. The total number of homes within the bounded area may be calculated. For lengthy calculations, a progress bar may be provided to a user to confirm that the operation is still processing but not yet complete.

Once the calculation of the total number of homes in the defined geographic area is complete, the results may be provided to a user, for example via a visual interface. A user may also be provided an interface feature to begin the campaign, for example, a "start campaign" button.

In one embodiment, whether a campaign can be started may be at least partially dependent on whether the geographic area has been successfully defined and/or uploaded to a database, blob storage, and/or other data storage structure that would be appreciated by a person of skill in the art after having the benefit of this disclosure. To assist with making this determination, the campaign component 850 may determine whether the campaign parameters are set to automated, whether an ad account for third-party marketing platform is defined and associated with the user's profile, and whether the rest of the requirements appear to be complied with by the user.

In instances where a third-party marketing platform account is not established or otherwise undefined, the campaign component 850 may assist with locating and/or creating a third-party marketing platform account and associating it with the user's account in a system enabled by this disclosure. In one embodiment, if the campaign component fails or is otherwise unable to associate a third-party marketing platform account with a user's account with the system enabled by this disclosure, the user may be required to complete the campaign creation in manual mode.

The user may then be directed to login to the third-party marketing platform account. In one embodiment, a panel or other interface feature may be provided by the campaign component, dashboard component, or other component of a system enabled by this disclosure to facilitate login with the third-party marketing platform. Login information may be saved to facilitate quick login or persistent login for future sessions. Additionally, in some embodiments, saved login credentials may be used to login a user substantially automatically to the third-party marketing platform with minimal interaction required by the user.

In some cases, a user may be required to accept permissions requested from the third-party marketing platform, such as may relate to email address, pages shown list, public profile, business management profile, ads management profile, and other permissions that would be appreciated by a person of skill in the art after having the benefit of this disclosure. If permissions remain to be accepted, the campaign component may display such conditions and interface features to accept the terms and other permissions to facilitate setting up the campaign.

In one embodiment, an invite may be sent to a business manager associated with the operator of a system enabled by this disclosure, advantageously allowing them to assist with the creation of a sales and marketing campaign and associating the campaign with the third-party marketing platform. Additional features may be provided to a user to approve sharing of data with the business manager and/or other designated parties.

If any additional terms and conditions require acceptance by the user, such terms may be displayed to the user via the campaign component, which may be assisted with other components of a system enabled by this disclosure, for example, the dashboard component. Once the user has accepted all the necessary terms, permissions, conditions, and other agreements, the user may choose a page on the third-party marketing platform for which the user has access and desires to use for distributing the campaign to prospective customers. In some embodiments, the selected pages may include a landing page to assist with tracking and engagement with prospective customers. In additional embodiments, the selected pages may include a business profile page created through the third-party marketing platform.

In an additional step, billing information relating to the third-party marketing platform may be defined and payment details may be provided. For example, parameters regarding the advertising campaign may be defined relating to duration, keywords, scope, click-through price, prioritization, and/or other advertising variables that would be appreciated by a person of skill in the art after having the benefit of this disclosure. Additional campaign variables may be defined such as a campaign name, start date, end date, lifetime budget, duration, and other information that would be appreciated by skilled artisans after having the benefit of this disclosure. Payment information may be associated with such a campaign to fund the advertising, for example, via bank account, ACH transfer, credit card transfer, third-party vending services, and/or payment processing services, without limitation.

With the campaign variables and payment information provided, a user may design the aesthetic and/or visual appearance of the advertisement. In one embodiment, ad templates may be provided to facilitate creation of the advertising materials. Optionally, a draft of an advertisement may be saved to provide a user flexibility in defining the advertisement over an extended period of time. A user may preview a designed advertisement prior to commencing the campaign, advantageously allowing a user to possess a better understanding of what potential customers will view before sending, displaying, and/or otherwise sharing the advertisements to them.

Once the advertisement is defined, optionally previewed, and approved, the user may define notification settings relating to the campaign. These notification settings may include email updates, phone numbers for calls and messaging, third-party messaging platforms, designated agents, and other notification settings that would be appreciated by those having skill in the art, without limitation. Notifications may be provided to users regarding campaign status, engagement, prospective customer contact requests, campaign balances, and other information consistent with the scope and spirit of this disclosure.

With the details of a campaign defined, the campaign may be validated, and distribution of the campaign may commence. Upon commencement, the campaign component may communicate with the third-party marketing platform to ensure that all of the selected and defined parameters through the above steps are compliant with the third-party marketing platform requirements and facilitate creation of the campaign. For example, the campaign component may store web page information relating to the advertising campaign to the third-party marketing platform, generate an audience through the third-party marketing platform such as using a cloud computing function, validate successful creation of the audience, and provide other setup features that would be appreciated by skilled artisans.

The campaign component 850 may additionally set up a source app using a weather template, which may source weather information from public sources, private sources, proprietary sources, and/or other sources without limitation. The campaign component may then create and validate the advertising campaign on the third-party marketing platform, which may include images, hashes, copy, verbiage, and other information to be included with the advertising campaign.

In examples where geotargets are defined, the campaign component 850 may create a geographic boundary in the third-party marketing platform. In one example, a geographic boundary may be provided as a circle with a centroid on the swath and a radius emanating from the circle to substantially enclose the above defined geographic boundary. Additional targets may be added as additional geographic areas are defined, which may each include varying centroids and/or radii. Geotargets may be varied, altered, or otherwise redefined throughout an advertising campaign to assist with ensuring a desired selection of prospective customers are included in the campaign.

The campaign component 850 may then additionally create a custom audience set, which may be validated to ensure successful creation. Targeting optimization may be enabled, facilitating delivery of the advertising materials to the selected audience.

In one embodiment, a finance management product may be created to display costs associated with the services for the advertising campaign. These costs may be shared with the user, including internal teammates of the user, to allow the user to monitor the status of a campaign. Information relating to the campaign may be stored in a database provided by a system enabled by this disclosure, for example a SQL database, which may include details regarding the selections and campaign parameters discussed above.

Once the above automated campaign creation features are complete, the advertising campaign may commence, and the advertisements may begin being distributed or otherwise displayed to prospective customers. A link may be provided to the user to close the interface associated with setting up the campaign component, manage details relating to the campaign, review metrics and other details regarding the campaign, access other features via the dashboard component, or otherwise interface with a system enabled by this disclosure.

While various aspects have been described in the above disclosure, the description of this disclosure is intended to illustrate and not limit the scope of the invention. The invention is defined by the scope of the appended claims and not the illustrations and examples provided in the above disclosure. Skilled artisans will appreciate additional aspects of the invention, which may be realized in alternative embodiments, after having the benefit of the above disclosure. Other aspects, advantages, embodiments, and modifications are within the scope of the following claims.

What is claimed is:

1. A sales and marketing assistance system comprising a non-transitory computer-readable storage medium, excluding transitory signal transmission, and comprising instructions that, in response to execution, cause the system comprising a processor to perform operations comprising:
 (a) retrieving data comprising raw data from a provider comprising information relating to a weather event, the data being storable in a database via a fetch component
 (b) generating extracted information from the data comprising the raw data indicative of a condition to increase a likelihood of conversion that a prospective customer will engage in a commercial transaction via a parse component, the extracted information comprising event information associated with an event identified from the data;
 (c) generating derived information from the data reflective of the prospective customer to build a prospective customer profile via an analytic component, the derived information being associated with the prospective customer identified from the data by applying analysis rules, the derived information being different from and supplemental to the data and the extracted information;
 (d) generating predictive information by determining a probability of correlation between the extracted information and the derived information indicative of a predictive correlation that the prospective customer has an elevated likelihood of conversion to engage in the commercial transaction via an insight component by applying machine learning trained with at least the extracted information and/or the derived information to detect patterns of predictable outcomes given various combinations of input conditions;
 (e) presenting the predictive information and facilitating the commercial transaction via a dashboard component, the dashboard component at least partially visualizing the predictive information via a display by visually presenting the derived information in the context of the extracted information via a map comprising a geographic boundary in which the prospective customer is located via a mapping component, wherein the geographic boundary of the event layer is at least partially generated using ray casting;
 wherein the machine learning operated by step (d) determines weighted assumptions about how the prospective customer would engage in the commercial transaction based on information accessed from the database comprising proximity to the weather event, relevant search activity by the prospective customer, and consumer spending data for the prospective customer to predict whether the prospective customer has the elevated likelihood of conversion; and
 wherein the weighted assumptions used by the machine learning are updated by the system to adjust weighting to reflect how performant outcomes of past assumptions of the machine learning were and improve future predictive capabilities based on updated weighted assumptions.

2. The system of claim 1, wherein at least part of the extracted information, at least part of the derived information, and at least part of the prospective customer profile are stored in the database and retrievable from the database via a telecommunication network.

3. The system of claim 1, wherein the machine learning is additionally trained with at least input conditions comprising case studies comprising demographics, psychographics, homeowner information, household types, household details, property details, and/or the weather events.

4. The system of claim 1, wherein the map selectively displays historical information, past information, substantially real-time information, and predictive future information relating to the weather event as it relates to the prospective customer.

5. The system of claim 1, wherein the mapping component outputs a mapping visualization product comprising:
an event layer defining the geographic boundary using the extracted information relating to the event; and
a prospective customer layer defining the prospective customer having the elevated likelihood of conversion relating to the event.

6. The system of claim 1, further comprising:
(f) performing contact management via a contact management component comprising:
(i) matching psychographics via a psychographics matching engine to extract the psychographics from the prospective customer profile indicative of an agreeability condition for the prospective customer, and
(ii) recommending an agent via an agent recommendation engine to select the agent possessing an agreeability approach to increase a likelihood of relatability with the agreeability condition of the prospective customer associated with the prospective customer profile; and
wherein the agent having the likelihood of relatability that is sufficient is recommended to propose the commercial transaction to the prospective customer.

7. The system of claim 6:
wherein the operation of step (f) further comprises generating a match index associated with the prospective customer indicative of the likelihood of conversion; and
wherein the match index is adjusted based on at least the psychographics of the prospective customer, inclusion of the prospective customer in the geographic boundary, and/or the event.

8. The system of claim 7:
wherein a personality profile is associated with the prospective customer reflective of at least internet activity history and commercial purchase history; and
wherein the match index is adjusted considering the personality profile of the prospective customer.

9. The system of claim 6, wherein the operation of step (f) further comprises:
(iii) selectively displaying the prospective customer based on at least the psychographics, inclusion in the geographic boundary, and/or the event via a filtering engine.

10. The system of claim 6:
wherein the content management component is accessible by the agent via the dashboard component;

wherein the agreeability condition associated with the prospective customer is displayed via the dashboard component;
wherein the likelihood of relatability between the agent and the prospective customer is displayed by the dashboard component; and
wherein the agent and the prospective customer are matched via the dashboard component.

11. The system of claim 6, further comprising:
(g) facilitating communication between the agent and the prospective customer via a messaging component, the communication being logged and analyzed to identify a strategy that increases the likelihood of conversion.

12. The system of claim 1, further comprising:
(h) analyzing feedback from a converted customer and derive referral information indicative of the potential customer having a likelihood of influenceability from the converted customer via a review management component; and
wherein the referral information is analyzed by the insight component in determining a probability of conversion.

13. The system of claim 1, wherein the data comprises:
weather data indicative of the weather event; and
wherein the event comprises the weather event.

14. A sales and marketing assistance system comprising:
a fetch component to retrieve data comprising raw data from a provider comprising information relating to a weather event, the data being storable in a database;
a parse component to generate extracted information from the data comprising the raw data indicative of a condition to increase a likelihood of conversion that a prospective customer will engage in a commercial transaction, the extracted information comprising event information associated with an event identified from the data;
an analytic component to generate derived information from the data reflective of the prospective customer to build a prospective customer profile, the derived information being associated with the prospective customer identified from the data, the derived information being different from and supplemental to the data and the extracted information;
an insight component to generate predictive information by determining a probability of correlation between the extracted information and the derived information indicative of a predictive correlation that the prospective customer has an elevated likelihood of conversion to engage in the commercial transaction; and
a contact management component comprising:
a psychographics matching engine to extract psychographics from the prospective customer profile indicative of an agreeability condition for the prospective customer, and
an agent recommendation engine to select an agent possessing an agreeability approach to increase a likelihood of relatability with the agreeability condition of the prospective customer associated with the prospective customer profile,
wherein the agent having the likelihood of relatability that is sufficient is recommended to propose the commercial transaction to the prospective customer;
a dashboard component to present the predictive information and facilitate the commercial transaction, the dashboard component at least partially visualizing the predictive information via a display; wherein the dashboard component further comprises a mapping component to visually present the derived information in the context of the extracted information via a map comprising a geographic boundary in which the prospective customer is located, wherein the geographic boundary of the event layer is at least partially generated using ray casting;

wherein at least part of the extracted information, at least part of the derived information, and at least part of the prospective customer profile are stored in the database and retrievable from the database via a telecommunication network;

wherein the insight component generates the predictive information by applying machine learning trained with at least the extracted information and/or the derived information;

wherein the machine learning operated by the insight component determines weighted assumptions about how the prospective customer would engage in the commercial transaction based on information accessed from the database comprising proximity to the weather event, relevant search activity by the prospective customer, and consumer spending data for the prospective customer to predict whether the prospective customer has the elevated likelihood of conversion; and wherein the weighted assumptions used by the machine learning are updated by the system to adjust weighting to reflect how performant outcomes of past assumptions of the machine learning were and improve future predictive capabilities based on updated weighted assumptions.

15. The system of claim 14, wherein the mapping component outputs a mapping visualization product comprising: an event layer defining the geographic boundary using the extracted information relating to the event, and a prospective customer layer defining the prospective customer having the elevated likelihood of conversion.

16. The system of claim 15:
wherein the contact management component generates a match index associated with the prospective customer indicative of the likelihood of conversion;
wherein the match index is adjusted based on at least the psychographics of the prospective customer, inclusion of the prospective customer in the geographic boundary, and/or the event;
wherein a personality profile is associated with the prospective customer reflective of at least internet activity history and commercial purchase history; and
wherein the match index is adjusted considering the personality profile of the prospective customer.

17. A method for providing sales assistance via a sales and marketing assistance system comprising machine readable non-transitory storage medium on which executable program instructions are stored that when executed cause a computerized device to operate the sales and marketing assistance system, the method comprising:
(a) retrieving data comprising raw data from a provider comprising information relating to a weather event, the data being storable in a database;
(b) generating extracted information from the data comprising the raw data indicative of a condition to increase a likelihood of conversion that a prospective customer will engage in a commercial transaction, the extracted information comprising event information associated with an event identified from the data;
(c) generating derived information from the data reflective of the prospective customer to build a prospective customer profile, the derived information being associated with the prospective customer identified from the data, the derived information being different from and supplemental to the data and the extracted information;
(d) generating predictive information by determining a probability of correlation between the extracted information and the derived information indicative of a predictive correlation that the prospective customer has an elevated likelihood of conversion to engage in the commercial transaction by applying machine learning trained with at least the extracted information and/or the derived information to detect patterns of predictable outcomes given various combinations of input conditions; and
(e) presenting the predictive information and facilitating the commercial transaction via a dashboard component by at least partially visualizing the predictive information via a display;
(f) presenting visually the derived information in the context of the extracted information via a map comprising a geographic boundary in which the prospective customer is located, wherein the geographic boundary of the event layer is at least partially generated using ray casting;
wherein the machine learning operated by step (d) determines weighted assumptions about how the prospective customer would engage in the commercial transaction based on information accessed from the database comprising proximity to the weather event, relevant search activity by the prospective customer, and consumer spending data for the prospective customer to predict whether the prospective customer has the elevated likelihood of conversion;
wherein the weighted assumptions used by the machine learning are updated by the system to adjust weighting to reflect how performant outcomes of past assumptions of the machine learning were and improve future predictive capabilities based on updated weighted assumptions; and
wherein at least part of the extracted information, at least part of the derived information, and at least part of the prospective customer profile are stored in the database and retrievable from the database via a telecommunication network.

18. The method of claim 17, comprising: (g) outputting a mapping visualization product comprising: an event layer defining the geographic boundary using the extracted information relating to the event, and a prospective customer layer defining the prospective customer relating to the event having the elevated likelihood of conversion.

19. The method of claim 18, further comprising:
(h) extracting psychographics from the prospective customer profile indicative of an agreeability condition for the prospective customer;
(i) selecting an agent possessing an agreeability approach to increase a likelihood of relatability with the agreeability condition of the prospective customer associated with the prospective customer profile;
(j) recommending the agent having the likelihood of relatability that is sufficient to propose the commercial transaction to the prospective customer;
(k) generating a match index associated with the prospective customer indicative of the likelihood of conversion; and
(l) adjusting the match index based on at least the psychographics of the prospective customer, inclusion of the prospective customer in the geographic boundary, and/or the event.

* * * * *